US012627079B2

(12) United States Patent

Tezuka et al.

(10) Patent No.: US 12,627,079 B2

(45) Date of Patent: May 12, 2026

(54) ANTENNA DEVICE AND ANTENNA MODULE

(71) Applicant: TDK Corporation, Tokyo (JP)

(72) Inventors: Kenichi Tezuka, Tokyo (JP); Yasuharu Miyauchi, Tokyo (JP); Yousuke Futamata, Tokyo (JP); Misaki Tabata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 58 days.

(21) Appl. No.: 18/619,322

(22) Filed: Mar. 28, 2024

(65) Prior Publication Data

US 2024/0332822 A1 Oct. 3, 2024

(30) Foreign Application Priority Data

Mar. 31, 2023 (JP) ................................ 2023-057869

(51) Int. Cl.

*H01Q 21/28* (2006.01)

*H01Q 1/38* (2006.01)

(52) U.S. Cl.

CPC ............... *H01Q 21/28* (2013.01); *H01Q 1/38* (2013.01)

(58) Field of Classification Search

CPC ........ H01Q 21/28; H01Q 1/38; H01Q 1/2283; H01Q 9/0407; H01Q 9/0414; H01Q 21/065

See application file for complete search history.

(56) References Cited

U.S. PATENT DOCUMENTS

| | | | | |
|---|---|---|---|---|
| 7,639,183 B2 * | 12/2009 | Teshirogi | H01Q 13/06 343/895 |
| 8,749,446 B2 * | 6/2014 | Manry, Jr. | H01Q 9/0464 343/866 |
| 2002/0033770 A1 * | 3/2002 | Akiyama | H01Q 9/0435 343/702 |
| 2004/0135731 A1 * | 7/2004 | Komatsu | H01Q 1/1271 343/713 |
| 2004/0174304 A1 * | 9/2004 | Komatsu | H01Q 9/0414 343/711 |
| 2009/0140946 A1 * | 6/2009 | Ziolkowski | H01Q 13/10 343/788 |
| 2012/0229356 A1 * | 9/2012 | Sudo | H01Q 19/005 343/834 |
| 2012/0287000 A1 * | 11/2012 | Ando | H01Q 21/08 174/250 |
| 2014/0378813 A1 * | 12/2014 | Saroka | A61B 5/0507 600/407 |

(Continued)

FOREIGN PATENT DOCUMENTS

| | | |
|---|---|---|
| JP | 2005-252648 A | 9/2005 |
| JP | 2022-024435 A | 2/2022 |

(Continued)

*Primary Examiner* — Dameon E Levi

*Assistant Examiner* — Jordan E. DeWitt

(74) *Attorney, Agent, or Firm* — OLIFF PLC.

(57) ABSTRACT

An antenna device includes: a dielectric layer; radiation conductors provided to the dielectric layer; and a plurality of columnar conductors disposed around the radiation conductor in plan view seen from a normal direction of the radiation conductor, and peripheral conductors are disposed on an outer side of the plurality of columnar conductors in plan view seen from the normal direction.

11 Claims, 23 Drawing Sheets

(56) References Cited

U.S. PATENT DOCUMENTS

| | | | | |
|---|---|---|---|---|
| 2016/0037640 | A1* | 2/2016 | Takai | H05K 1/18 361/753 |
| 2017/0201011 | A1* | 7/2017 | Khripkov | H01Q 1/42 |
| 2017/0222316 | A1* | 8/2017 | Mizunuma | H01Q 21/062 |
| 2020/0014113 | A1* | 1/2020 | Asaka | H01Q 9/0414 |
| 2021/0036736 | A1* | 2/2021 | Uchimura | H01Q 15/0026 |
| 2021/0359424 | A1* | 11/2021 | Hiramatsu | H01Q 21/0006 |
| 2021/0399414 | A1* | 12/2021 | Hara | H01Q 1/422 |
| 2022/0199485 | A1* | 6/2022 | Otsubo | H05K 1/02 |
| 2022/0199504 | A1* | 6/2022 | Otsubo | H01L 23/49838 |
| 2022/0216590 | A1* | 7/2022 | Yamakawa | H01Q 21/065 |
| 2022/0407489 | A1* | 12/2022 | Watanabe | H05K 3/46 |
| 2023/0006361 | A1* | 1/2023 | Sakurai | H01Q 21/065 |
| 2023/0187821 | A1* | 6/2023 | Hara | H01Q 9/0457 343/702 |
| 2023/0411848 | A1* | 12/2023 | Yoshikawa | H01Q 5/35 |
| 2024/0332822 | A1* | 10/2024 | Tezuka | H01Q 9/0407 |
| 2024/0332823 | A1* | 10/2024 | Tezuka | H01Q 1/38 |

FOREIGN PATENT DOCUMENTS

| | | | | |
|---|---|---|---|---|
| WO | 2019/054094 | A1 | 3/2019 | |
| WO | WO-2021106377 | A1 * | 6/2021 | H01Q 1/523 |

* cited by examiner

ANTENNA DEVICE AND ANTENNA MODULE

CROSS REFERENCE TO RELATED APPLICATIONS

This application claims priority to Japanese Patent Application No. 2023-057869 filed on Mar. 31, 2023, the entire contents of which are incorporated by reference herein.

TECHNICAL FIELD

The present disclosure relates to an antenna device and an antenna module.

BACKGROUND

Conventionally, there is known an antenna device described in International Publication WO 2019/054094 A as antenna devices. This antenna device includes radiation conductors disposed inside a dielectric layer and a plurality of columnar conductors disposed around the radiation conductor.

SUMMARY

An antenna device according to one aspect of the present disclosure includes: a dielectric layer; a radiation conductor provided to the dielectric layer; and a plurality of columnar conductors disposed around the radiation conductor in plan view seen from a normal direction of the radiation conductor, and a peripheral conductor is disposed on an outer side of the plurality of columnar conductors in plan view seen from the normal direction.

DETAILED DESCRIPTION

Here, the above-described antenna device has been required to improve radiation efficiency of signals to be radiated from the radiation conductors.

It is therefore an object of the present disclosure is to provide an antenna device that can improve radiation efficiency, and an antenna module.

According to one aspect of the present disclosure, it is possible to provide an antenna device that can improve radiation efficiency, and an antenna module.

Hereinafter, an embodiment of the present disclosure will be described in detail. However, the present disclosure is not limited to the following embodiment.

Figure 1:
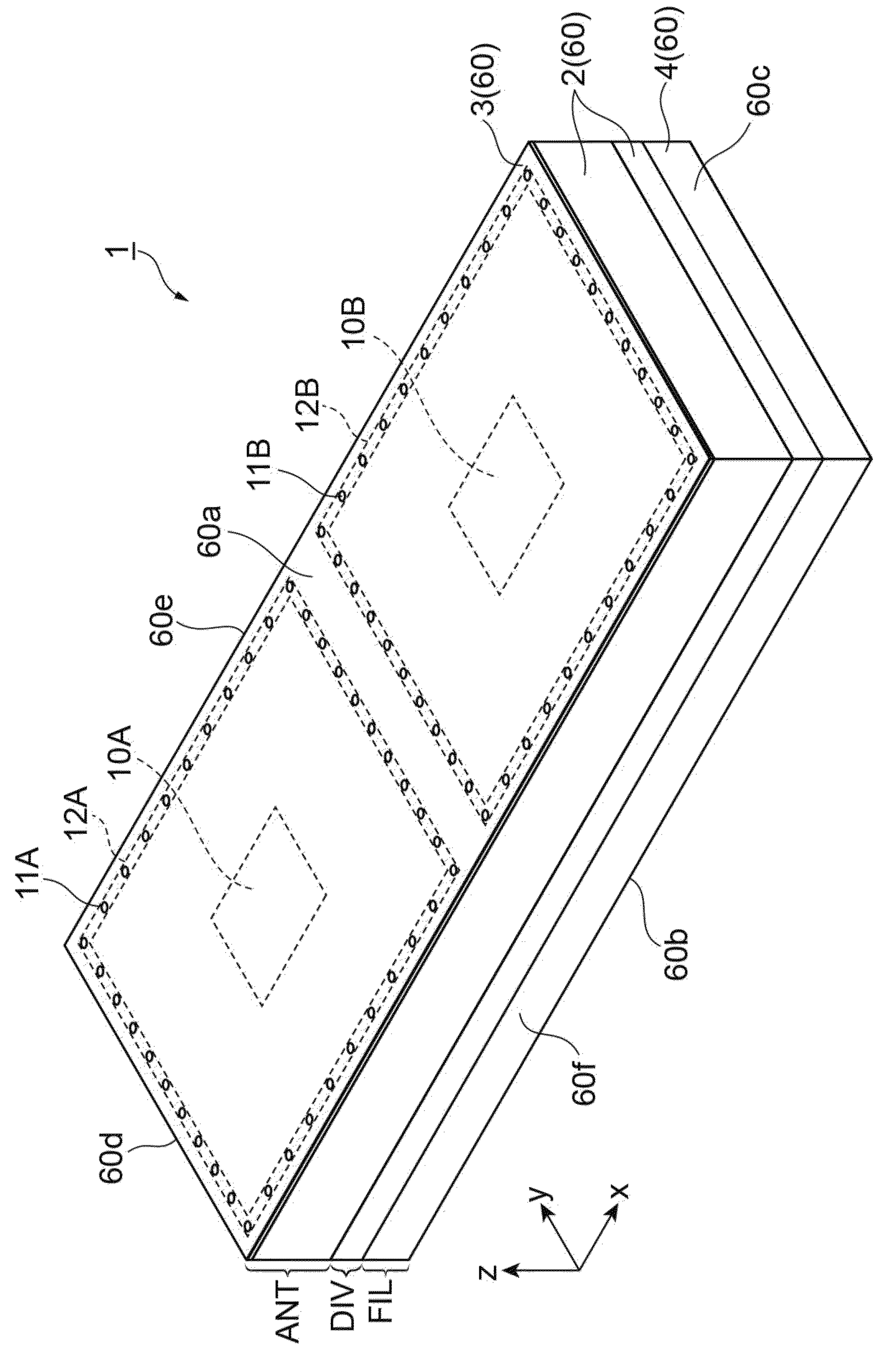
FIG. 1 is a schematic perspective view illustrating the external appearance of an antenna device according to an embodiment of the present disclosure.
Figure 2:
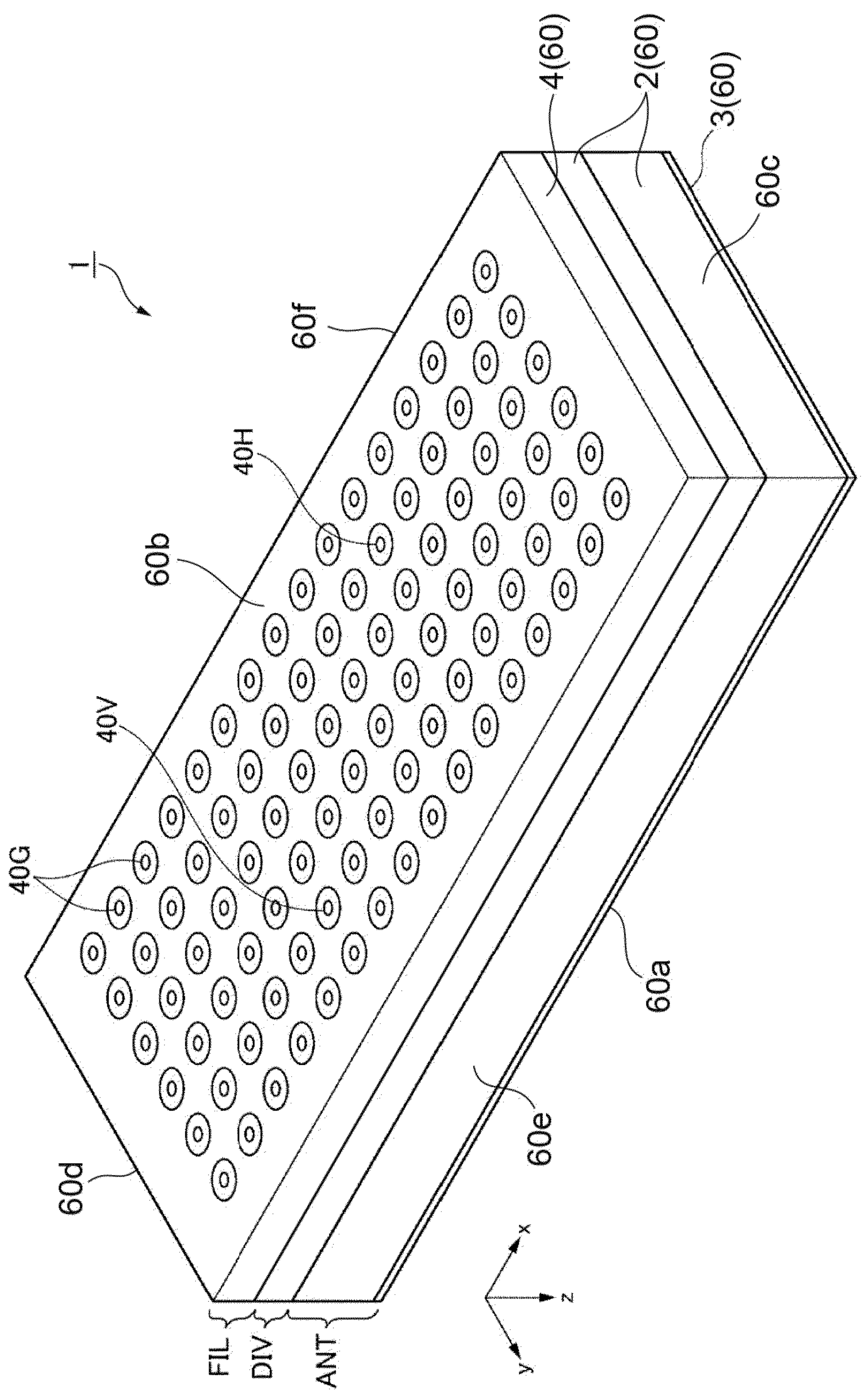
FIG. 2 is a schematic perspective view illustrating the external appearance of the antenna device according to the embodiment of the present disclosure.
Figure 3:
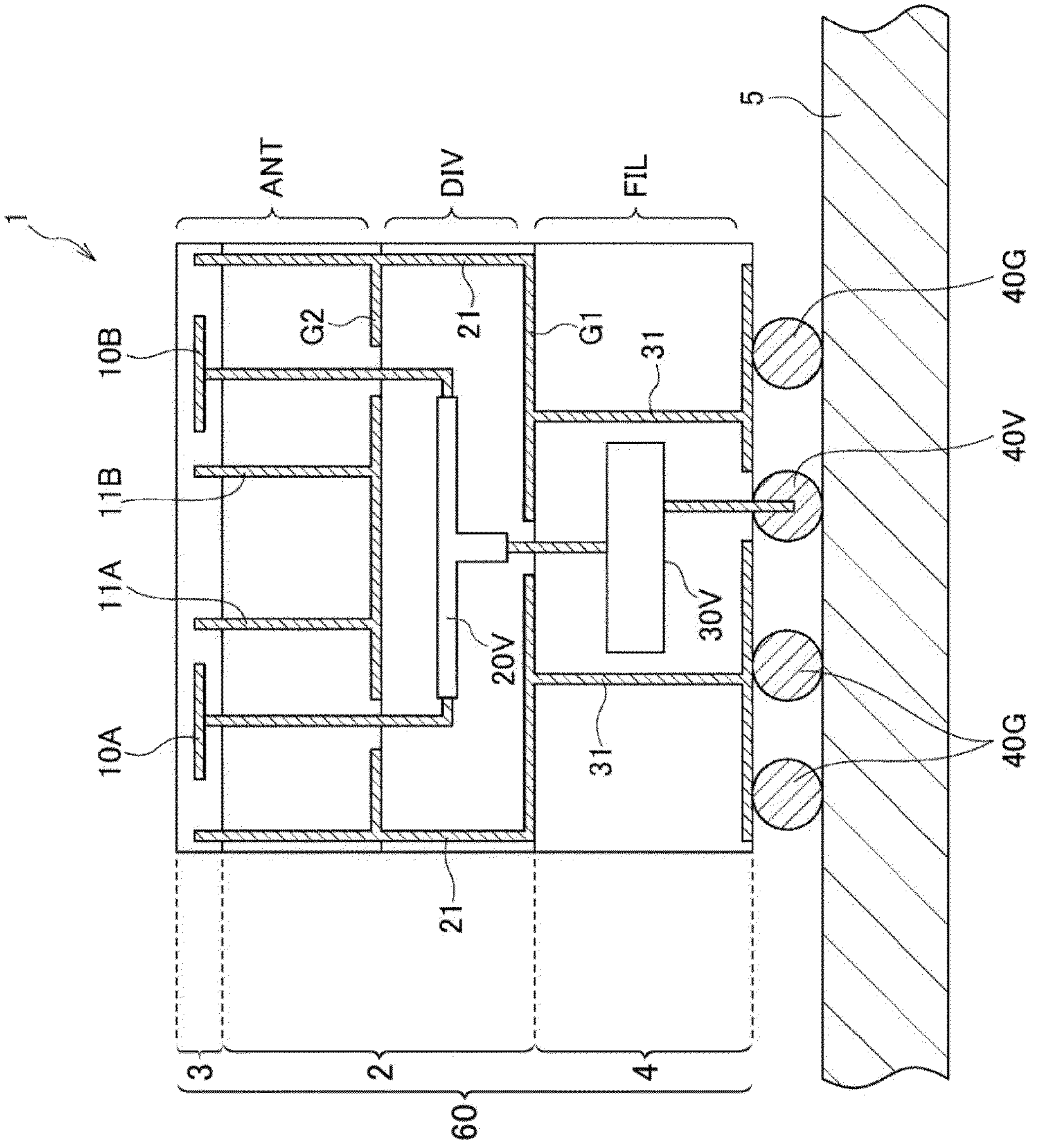
FIG. 3 is a schematic view for describing an internal structure of the antenna device according to the present embodiment.
Figure 4:
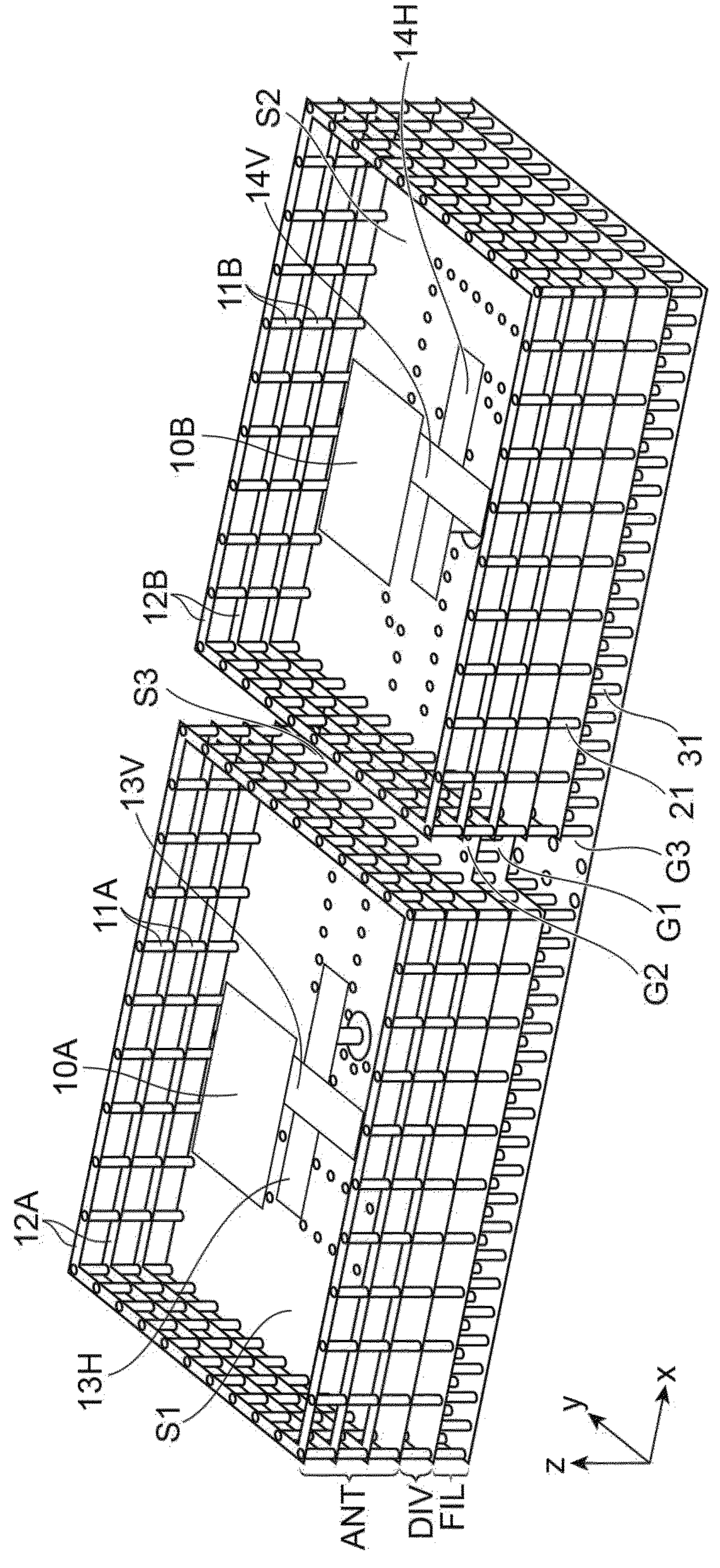
FIG. 4 is a schematic perspective view illustrating a state where dielectric layers are removed from the antenna device.

FIG. 1 is a schematic perspective view illustrating the external appearance of an antenna device 1 according to the embodiment of the present disclosure, and illustrates a state seen from a radiation surface side. FIG. 2 is a schematic perspective view illustrating the external appearance of the antenna device 1 according to the embodiment of the present disclosure, and illustrates a state seen from a mounting surface side. FIG. 3 is a schematic view for describing the internal structure of the antenna device 1, and schematically illustrates a state where the antenna device 1 is mounted on a motherboard 5. FIG. 4 is the schematic perspective view illustrating a state where dielectric layers 2 to 4 are removed from the antenna device 1.

Hereinafter, the embodiment of the present disclosure will be described in detail with reference to the accompanying drawings.

FIGS. 1 and 2 are the schematic perspective views illustrating the external appearance of the antenna device 1 according to the embodiment of the present disclosure, FIG. 1 illustrates the state seen from the radiation surface side, and FIG. 2 illustrates the state seen from the mounting surface side.

As illustrated in FIGS. 1 and 2, the antenna device 1 according to the present embodiment includes a dielectric layer 60. The dielectric layer 60 includes the first dielectric layer 2, the second dielectric layer 3, and the third dielectric layer 4. The third dielectric layer 4, the first dielectric layer 2, and the second dielectric layer 3 are laminated in this order from the negative side to the positive side in a z direction. The dielectric layer 60 has a rectangular parallelepiped shape having a longitudinal direction in an X axis direction. The dielectric layer 60 includes a top surface 60*a*, a bottom surface 60*b*, end surfaces 60*c* and 60*d*, and side surfaces 60*e* and 60*f*. The top surface 60*a* and the bottom surface 60*b* oppose to each other in the z direction, the top surface 60*a* is disposed on the positive side in the z direction, and the bottom surface 60*b* is disposed on the negative side in the z direction. The end surfaces 60*c* and 60*d* oppose to each other in an x direction, the end surface 60*c* is disposed on the positive side in the x direction, and the end surface 60*d* is disposed on the negative side in the x direction. The side surfaces 60*e* and 60*f* oppose to each other in a y direction, the side surface 60*e* is disposed on the positive side in the y direction, and the side surface 60*f* is disposed on the negative side in the y direction.

The antenna device 1 includes an antenna layer ANT, a filter layer FIL, and a distribution layer DIV laminated between the filter layer FIL and the antenna layer ANT.

The antenna layer ANT includes the first dielectric layer 2, the second dielectric layer 3, and a radiation conductor 10. The radiation conductor 10 includes a radiation conductor 10A (first radiation conductor) and a radiation conductor 10B (second radiation conductor). In the example illustrated in FIG. 3, the radiation conductors 10A and 10B are disposed in the second dielectric layer 3. In this regard, the radiation conductors 10A and 10B may be disposed on the first dielectric layer 2 and covered with the second dielectric layer 3. Furthermore, the radiation conductors 10A and 10B may be disposed on the top surface of the second dielectric layer 3 that is the outermost surface of the dielectric layer. Furthermore, the antenna layer ANT includes a plurality of ground conductors 11A (columnar conductors) surrounding the radiation conductor 10A and a plurality of ground conductors 11B (columnar conductors) surrounding the radiation conductor 10B in plan view seen from a lamination direction (z direction) that is a normal direction of the radiation conductors 10A and 10B. The ground conductors 11A and 11B are columnar conductors that extend in the z direction so as to penetrate the first dielectric layer 2. The plurality of ground conductors 11A are connected to ring-shaped ground rings 12A on a predetermined xy plane, and the plurality of ground conductors 11B are connected to ring-shaped ground rings 12B on the predetermined xy plane. Power feeding conductors to be described later are provided in spaces surrounded by the plurality of ground conductors 11A and 11B. As described above, the ground conductors 11A are disposed around the radiation conductor 10A and power feeding conductors 13V and 13H. The ground conductors 11B are disposed around the radiation conductor 10B and power feeding conductors 14V and 14H. End parts on a positive side of the plurality of ground conductors 11A and 11B in the z direction are covered with the second dielectric layer 3.

The distribution layer DIV includes the first dielectric layer 2 and conductor patterns buried in the first dielectric layer 2. The filter layer FIL includes the third dielectric layer 4, and conductor patterns that are buried in the third dielectric layer 4. Details of the filter layer FIL and the distribution layer DIV will be described later. The filter layer FIL constitutes a mounting surface for the motherboard. Signal terminals 40V and 40H and a plurality of ground terminals 40G are provided on the mounting surface. The signal terminal 40V is a terminal for inputting/outputting a vertical polarization antenna signal, and the signal terminal 40H is a terminal for inputting/outputting a horizontal polarization antenna signal. A ground potential is applied to the ground terminals 40G.

FIG. 3 is the schematic view for describing the internal structure of the antenna device 1 according to the present embodiment, and schematically illustrates a state where the antenna device 1 is mounted on the motherboard 5.

As illustrated in FIG. 3, a ground conductor G1 is provided between the filter layer FIL and the distribution layer DIV, and a ground conductor G2 is provided between the distribution layer DIV and the antenna layer ANT. The ground conductor G1 is provided at an interface between the third dielectric layer 4 and the first dielectric layer 2. The ground conductor G2 is buried in the first dielectric layer 2.

The filter layer FIL is provided with a filter circuit pattern 30V. The filter circuit pattern 30V is a band-pass filter, and is connected to the signal terminals 40V. The filter circuit pattern 30V is surrounded by a plurality of ground conductors 31 in plan view seen from the lamination direction. The ground conductors 31 (columnar conductors) are columnar conductors that extend in the z direction so as to penetrate the third dielectric layer 4. Although not illustrated in FIG. 3, the filter layer FIL also includes another filter circuit pattern that is connected to the signal terminals 40H.

The distribution layer DIV is provided with a distribution circuit pattern 20V. The distribution circuit pattern 20V is a circuit that distributes to the radiation conductors 10A and 10B an antenna signal fed from the filter circuit pattern 30V. The distribution circuit pattern 20V is surrounded by a plurality of ground conductors 21 (columnar conductors) in plan view seen from the lamination direction. The ground conductors 21 are the columnar conductors that extend in the z direction so as to penetrate the first dielectric layer 2. Although not illustrated in FIG. 3, the distribution layer DIV also includes another distribution circuit pattern that is connected to another filter circuit pattern. The first dielectric layer 2 includes the distribution circuit pattern 20V between the power feeding conductors 13V and 13H and the power feeding conductors 14V and 14H described later, and the third dielectric layer 4.

FIG. 4 is the schematic perspective view illustrating a state where dielectric layers 2 to 4 are removed from the antenna device 1.

As illustrated in FIG. 4, the power feeding conductors 13V and 13H (first power feeding conductors) that overlap the radiation conductor 10A seen from the z direction are provided in the space surrounded by the plurality of ground conductors 11A. The power feeding conductors 13V and 13H are coupled with the radiation conductor 10A. The first dielectric layer 2 includes the power feeding conductors 13V and 13H. Among these conductors, the power feeding conductor 13V is a conductor pattern whose longitudinal direction is the y direction, and supplies a vertical polarization antenna signal SV to the radiation conductor 10A. On the other hand, the power feeding conductor 13H is a conductor pattern whose longitudinal direction is the x direction, and supplies a horizontal polarization antenna signal SH to the radiation conductor 10A. The power feeding conductors 13V and 13H are located close to one end part of the conductor patterns, and receive supply of the antenna signals via the filter circuit pattern 30V and the distribution circuit pattern 20V (see FIG. 3). Hence, a power feeding position of the power feeding conductor 13V for the radiation conductor 10A differs from a power feeding position of the power feeding conductor 13H for the radiation conductor 10A by 90°.

Similarly, the power feeding conductors 14V and 14H (second power feeding conductors) that overlap the radiation conductor 10B seen from the z direction are provided in the space surrounded by the plurality of ground conductors 11B. The power feeding conductors 14V and 14H are coupled with the radiation conductor 10B. The first dielectric layer 2 includes the power feeding conductors 14V and 14H. Among these conductors, the power feeding conductor 14V is a conductor pattern whose longitudinal direction is the y direction, and supplies the vertical polarization antenna signal SV to the radiation conductor 10B. On the other hand, the power feeding conductor 14H is a conductor pattern whose longitudinal direction is the x direction, and supplies the horizontal polarization antenna signal SH to the radiation conductor 10B. The power feeding conductors 14V and 14H are located at positions close to one end parts of the conductor patterns, and receive supply of the antenna signals via the filter circuit pattern 30 and the distribution circuit pattern 20V (see FIG. 3). Hence, a power feeding position of the power feeding conductor 14V for the radiation conductor 10B differs from a power feeding position of the power feeding conductor 14H for the radiation conductor 10B by 90°.

Ground conductors G1 to G3 of large areas are provided below the antenna layer ANT. The ground conductors G1 to G3 are disposed closer to a negative side in a z axis direction than the power feeding conductors 13V and 13H and the power feeding conductors 14V and 14H. A region sandwiched between the ground conductor G1 and the ground conductor G2 is the distribution layer DIV. The ground conductor G1 and the ground conductor G2 are connected by the plurality of ground conductors 21. Here, in plan view seen from the z direction, each of the ground conductors G1 and G2 includes a region S1 that overlaps the space surrounded by the plurality of ground conductors 11A, a region S2 that overlaps the space surrounded by the plurality of ground conductors 11B, and a region S3 that connects the region S1 and the region S2. Furthermore, the width of the region S3 in the y direction is narrower than the widths of the regions S1 and S2 in the y direction. Consequently, mutual interference between the radiation conductors 10A and 10B via the ground conductors G1 and G2 is reduced, so that it is possible to enhance independence of the radiation conductor 10A and the radiation conductor 10B.

A region sandwiched between the ground conductor G1 and the ground conductor G3 is the filter layer FIL. The ground conductor G1 and the ground conductor G3 are connected by the plurality of ground conductors 31 (columnar conductors). The width of the ground conductor G3 in the y direction may be fixed.

Figure 5:
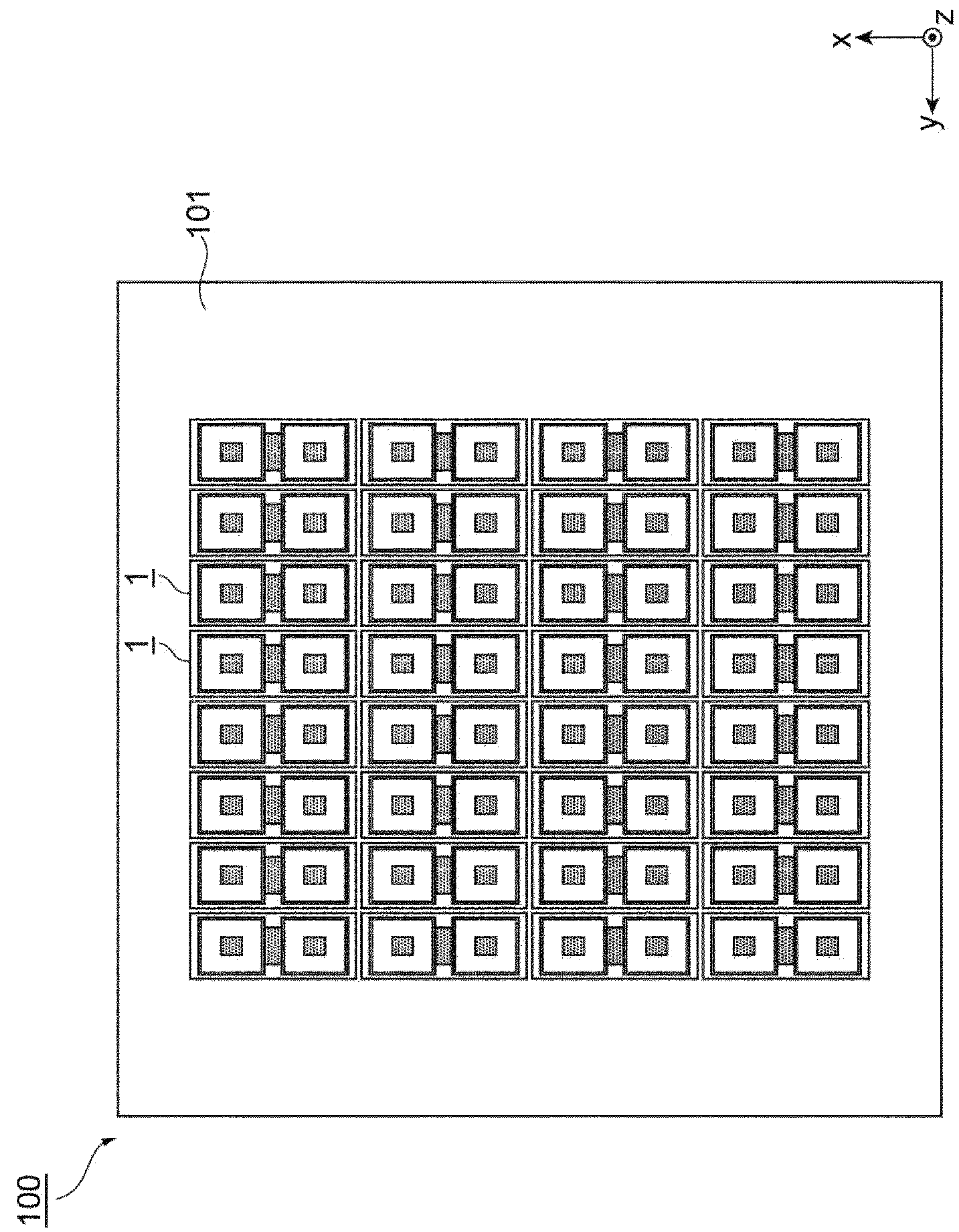
FIG. 5 is a plan view illustrating an antenna module.

As illustrated in FIG. 5, an antenna module 100 includes a plurality of the antenna devices 1. The antenna module 100 is provided by aligning the plurality of antenna devices 1 on a substrate 101. In an example illustrated in FIG. 5, the eight antenna devices 1 are aligned in the y direction and the four eight antenna devices 1 are aligned in the x direction. However, the number of the antenna devices 1 of the antenna module 100 is not particularly limited.

Figure 6C:
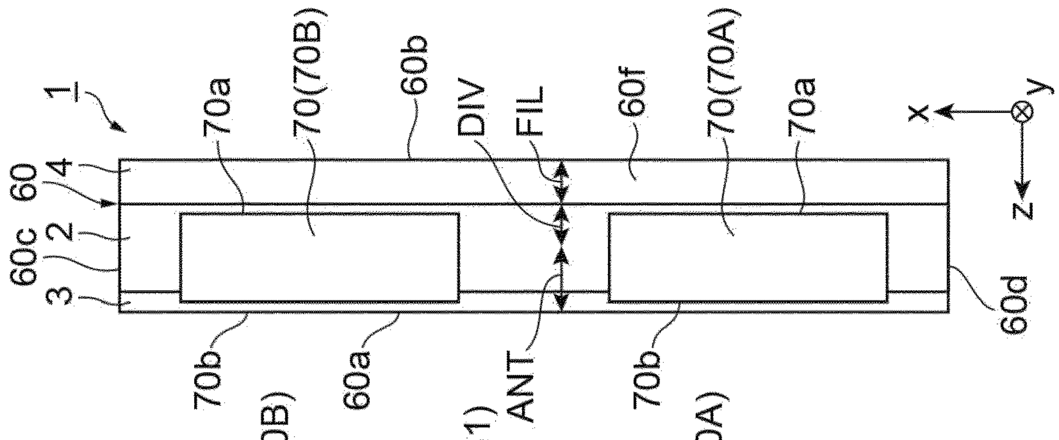
FIGS. 6A to 6C are views each illustrating the antenna device.
Figure 6B:
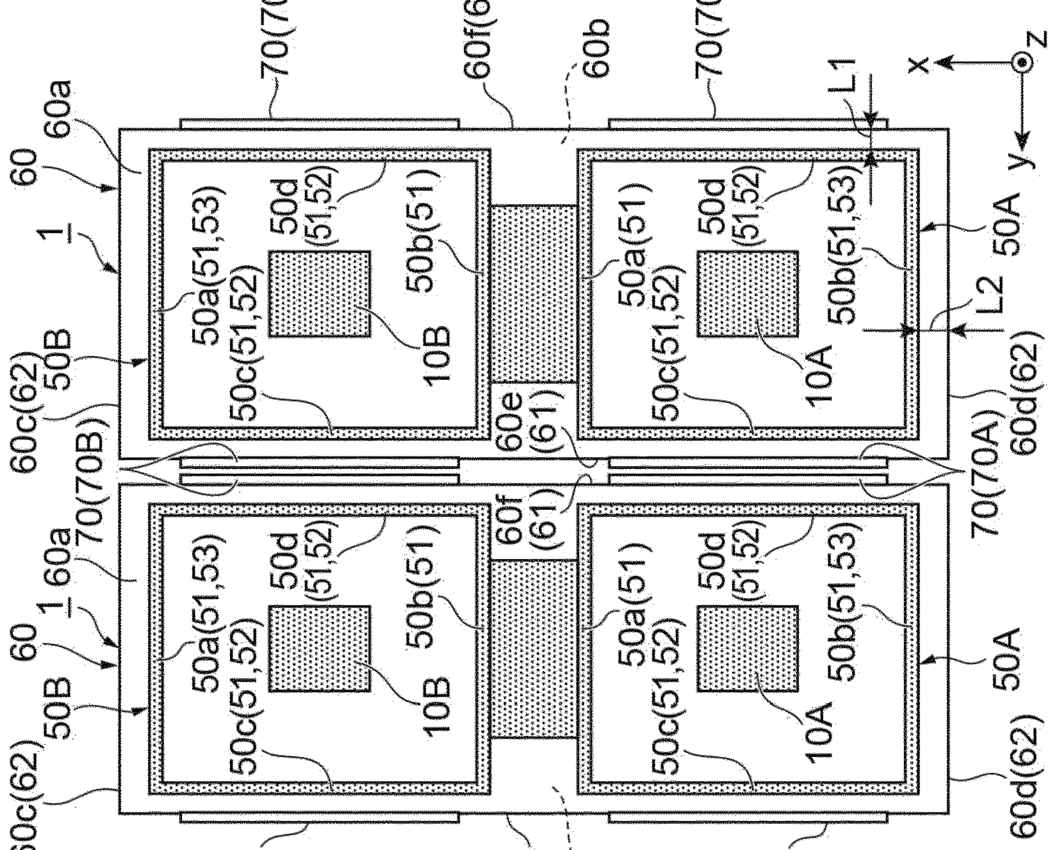
Figure 6A:
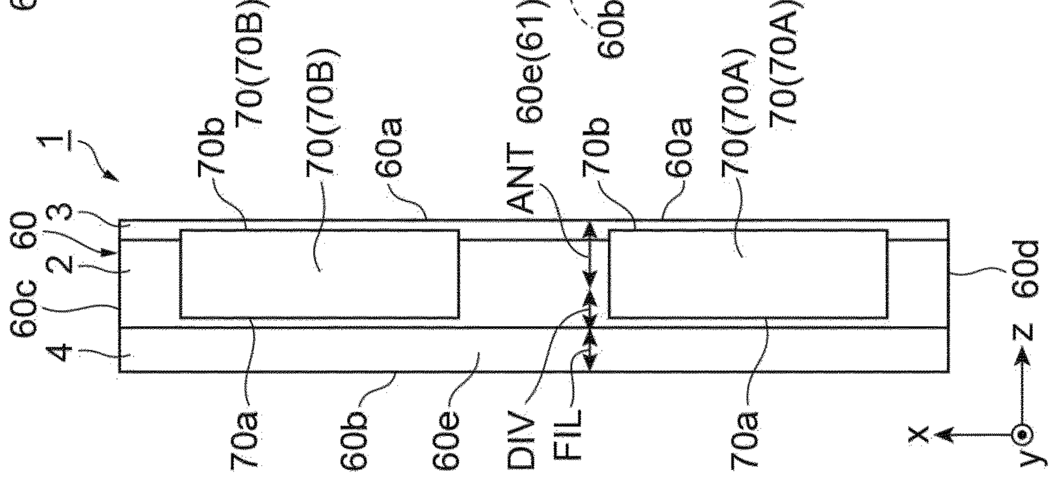

Next, a more detailed configuration of the antenna devices 1 aligned in the antenna module 100 will be described together with a positional relationship with the other antenna device 1 with reference to FIGS. 6A to 6C. FIGS. 6A to 6C illustrate the two antenna devices 1 aligned adjacent to each other in a Y axis direction. FIG. 6A is a side view of the alignment of the antenna devices 1 seen from the positive side in the y direction. FIG. 6B is a plan view of the alignment of the antenna devices 1 seen from the positive side in the z direction. FIG. 6C is a side view of the alignment of the antenna devices 1 seen from the negative side in the y direction. Note that expressions indicating directionality such as an “upper side” and a “top surface” are used in the description, yet are not limited to only the vertically upper side. Similarly, an expression indicating directionality such as a “lower side” is used, yet is not limited to only the vertically lower side.

FIG. 6B illustrates the above-described radiation conductors 10A and 10B. Furthermore, FIG. 6B illustrates ground conductors 50A and 50B disposed around the radiation conductors 10A and 10B. The ground conductor 50A includes the ground conductors 11A, 21, and 31 that are a plurality of columnar conductors disposed around the radiation conductor 10A, the ground rings 12A, and the ground conductors G1 and G2. The ground conductor 50A includes the ground conductors 11A, 21, and 31 that are a plurality of columnar conductors disposed around the radiation conductor 10A, and the ground rings 12A (see FIG. 4). The ground conductor 50B includes the ground conductors 11B, 21, and 31 that are a plurality of columnar conductors disposed around the radiation conductor 10B, the ground rings 12B, and the ground conductors G1 and G2 (see FIG. 4). Note that the ground conductors 11A, 11B, 21, and 31 may be collectively referred to as columnar conductors 51.

The ground conductors 50A and 50B have side parts 50*a*, 50*b*, 50*c*, and 50*d* that surround the radiation conductors 10A and 10B from four sides. The side part 50*a* extends in the y direction on the positive side in the x direction. The side part 50*b* extends in the y direction on the negative side in the x direction. The side part 50*c* extends in the x direction on the positive side in the y direction. The side part 50*d* extends in the x direction on the negative side in the y direction. Each of the side parts 50*a*, 50*b*, 50*c*, and 50*d* includes a plurality of the columnar conductors 51 aligned in a direction in which each of the side parts 50*a*, 50*b*, 50*c*, and 50*d* extends in plan view. As described above, the ground conductors 50A and 50B include the plurality of columnar conductors 51 disposed around the radiation conductors 10A and 10B.

The plurality of columnar conductors 51 of the ground conductor 50A include a plurality of first columnar conductors 52 disposed between first end parts 61 of the dielectric layer 60 in the y direction (first direction) and the radiation conductor 10A. In the present embodiment, the side surfaces 60*e* and 60*f* correspond to the first end parts 61. The side parts 50*c* and 50*d* include the first columnar conductors 52. The plurality of columnar conductors 51 of the ground conductor 50A include a plurality of second columnar conductors 53 disposed between a second end part 62 of the dielectric layer 60 in the x direction (second direction) perpendicular to the y direction and the radiation conductor 10A. In the present embodiment, the end surface 60*d* corresponds to the second end part 62. The side part 50*b* includes the second columnar conductors 53.

The plurality of columnar conductors 51 of the ground conductor 50B include the plurality of first columnar conductors 52 disposed between the first end parts 61 of the dielectric layer 60 in the y direction (first direction) and the radiation conductor 10B. In the present embodiment, the side surfaces 60*e* and 60*f* correspond to the first end parts 61. The side parts 50*c* and 50*d* include the first columnar conductors 52. The plurality of columnar conductors 51 of the ground conductor 50B include a plurality of second columnar conductors 53 disposed between the second end part 62 of the dielectric layer 60 in the x direction (second direction) perpendicular to the y direction and the radiation conductor 10B. In the present embodiment, the end surface 60*c* corresponds to the second end part 62. The side part 50*a* includes the second columnar conductors 53.

A distance between the plurality of first columnar conductors 52 and the first end parts 61 of the dielectric layer 60 is defined as a first distance L1. In the present embodiment, a distance in the y direction between the side parts 50*c* of the ground conductors 50A and 50B and the side surface 60*e* and a distance in the y direction between the side part 50*d* and the side surface 60*f* correspond to the first distance L1. A distance between the plurality of second columnar conductors 53 and the second end parts 62 of the dielectric layer 60 is defined as a second distance L2. In the present embodiment, the distance in the x direction between the side part 50*b* of the ground conductor 50A and the end surface 60*d* corresponds to the second distance L2. Furthermore, the distance in the x direction between the side part 50*a* of the ground conductor 50B and the end surface 60*c* corresponds to the second distance L2. The first distance L1 between the plurality of first columnar conductors 52 and the first end parts 61 of the dielectric layer 60 is shorter than the second distance L2 between the plurality of second columnar conductors 53 and the second end parts 62 of the dielectric layer 60. More specifically, the first distance L1 may be set to 100 to 500 μm. The second distance L2 may be set to a dimension of 150% to 300% of the first distance L1.

In plan view seen from the normal direction (z direction) of the radiation conductors 10A and 10B, peripheral conductors 70 are disposed on an outer side of the plurality of first columnar conductors 52. The peripheral conductor 70 is disposed on the outer side of each of the plurality of first columnar conductors 52 on the positive side (one side) in the y direction, and the plurality of first columnar conductors 52 on the negative side (other side) in the y direction. More specifically, the peripheral conductors 70 are disposed on the outer side on the positive side in the y direction with respect to the plurality of first columnar conductors 52 of the side part 50*c* on the positive side in the y direction. The peripheral conductors 70 are disposed on the outer side on the negative side in the y direction with respect to the plurality of first columnar conductors 52 of the side part 50*d* on the negative side in the y direction. Note that the peripheral conductors 70 may be disposed on the outer side of the plurality of second columnar conductors 53. The peripheral conductor 70 may be disposed on the outer side of each of the plurality of second columnar conductors 53 of the side part 50*b* on the negative side in the x direction among the plurality of columnar conductors 51 disposed around the radiation conductor 10A, and the plurality of second columnar conductors 53 of the side part 50*a* on the positive side in the x direction among the plurality of columnar conductors 51 disposed around the radiation conductor 10B.

The peripheral conductor 70 includes first peripheral conductors 70A and second peripheral conductors 70B. The first peripheral conductors 70A are located on the outer side of the plurality of first columnar conductors 52 disposed around the radiation conductor 10A. The second peripheral conductors 70B are located on the outer side of the plurality of first columnar conductors 52 disposed around the radiation conductor 10B. The first peripheral conductor 70A and the second peripheral conductor 70B are spaced away from each other.

The first peripheral conductors 70A are disposed at positions meeting the radiation conductor 10A in the x direction. The second peripheral conductors 70B are disposed at positions separated closer to the positive side in the x direction than the first peripheral conductors 70A in the x direction. The second peripheral conductors 70B are disposed at positions meeting the radiation conductor 10B in the x direction.

The peripheral conductor 70 is disposed on the side surfaces 60*e* and 60*f* of the dielectric layer 60 that expands along the normal direction (z direction) of the radiation conductors 10A and 10B. The peripheral conductors 70A and 70B on the positive side in the y direction are disposed on the side surface 60*e* of the dielectric layer 60 (see FIG. 6A). The peripheral conductors 70A and 70B on the negative side in the y direction are disposed on the side surface 60*f* of the dielectric layer 60 (see FIG. 6C).

As illustrated in FIG. 6B, both edges of the peripheral conductors 70A and 70B in the x direction are located on the inner side of the columnar conductors located at both ends of the plurality of first columnar conductors 52 in the x direction. The edges of the peripheral conductors 70A and 70B on the positive side in the x direction are located closer to the negative side in the x direction than the end parts (the positions of the side parts 50*a*) of the side parts 50*c* and 50*d* of the ground conductors 50A and 50B on the positive side in the x direction. The edges on the negative side of the peripheral conductors 70A and 70B in the x direction are located closer to the positive side in the x direction than the end parts (the positions of the side parts 50*b*) of the side parts 50*c* and 50*d* of the ground conductors 50A and 50B on the negative side in the x direction.

The dimensions of the peripheral conductors 70A and 70B in the x direction are larger than the dimensions of the radiation conductors 10A and 10B in the x direction. Both edges of the peripheral conductors 70A and 70B in the x direction are located on the outer side of both ends of the radiation conductors 10A and 10B in the x direction. The edges of the peripheral conductors 70A and 70B on the positive side in the x direction are located closer to the positive side in the x direction than the end parts of the radiation conductors 10A and 10B on the positive side in the x direction. The edges of the peripheral conductors 70A and 70B on the negative side in the x direction are located closer to the negative side in the x direction than the end parts of the radiation conductors 10A and 10B on the negative side in the x direction.

As illustrated in FIGS. 6A and 6C, edges 70*a* of the peripheral conductors 70A and 70B on a lower side (the negative side in the z direction) of the radiation conductors 10A and 10B in the normal direction are spaced away from the bottom surface 60*b* on a lower side of the dielectric layer 60 in the normal direction. The edges of the peripheral conductors 70A and 70B on the negative side in the z direction are disposed at positions spaced away from the bottom surface 60*b* of the dielectric layer 60 toward the positive side in the z direction. In the present embodiment, the edges of the peripheral conductors 70A and 70B on the lower side (the negative in the z direction) in the normal direction of the radiation conductors 10A and 10B may overlap the distribution layer DIV on the side surfaces 60*e* and 60*f* of the dielectric layer 60.

The edges of the peripheral conductors 70A and 70B on an upper side (the positive side in the z direction) in the normal direction of the radiation conductors 10A and 10B are spaced away from the top surface 60*a* of the dielectric layer 60 on an upper side in the normal direction. The edges of the peripheral conductors 70A and 70B on the positive side in the z direction are disposed at positions spaced away from the top surface 60*a* of the dielectric layer 60 toward the negative side in the z direction. In the present embodiment, the edges of the peripheral conductors 70A and 70B on the upper side (the positive side in the z direction) in the normal direction of the radiation conductors 10A and 10B may overlap the antenna layer ANT of the second dielectric layer 3 on the side surfaces 60*e* and 60*f* of the dielectric layer 60.

The peripheral conductor 70 is not connected with the ground conductor G2 provided between the distribution layer DIV and the antenna layer ANT. That is, the ground conductor G2 does not extend to the side surfaces 60*e* and 60*f*, and is not electrically connected with the peripheral conductors 70A and 70B. Furthermore, the peripheral conductor 70 is not connected with the ground conductors 50A and 50B.

As illustrated in FIG. 6B, the plurality of antenna devices 1 are disposed such that the peripheral conductors 70 thereof face each other. The antenna device 1 on the positive side in the y direction includes the peripheral conductors 70A and 70B on the side surface 60*f* on the negative side in the y direction. The antenna device 1 on the negative side in the y direction includes the peripheral conductors 70A and 70B on the side surface 60*e* on the positive side in the y direction. The peripheral conductors 70A and 70B of the side surface 60*f* of the antenna device 1 on the positive side in the y direction, and the peripheral conductors 70A and 70B on the side surface 60*e* of the antenna device 1 on the negative side in the y direction face each other in the y direction.

Next, functions and effects of the antenna device 1 and the antenna module 100 according to the present embodiment will be described.

The antenna device 1 according to the present embodiment includes the dielectric layer 60, the radiation conductors 10A and 10B that are provided to the dielectric layer 60, and the plurality of columnar conductors 51 that are disposed around the radiation conductors 10A and 10B in plan view seen from the normal direction of the radiation conductors 10A and 10B. The peripheral conductors 70 are disposed on the outer side of the plurality of columnar conductors 51 in plan view seen from the normal direction of the radiation conductors 10A and 10B. As described above, by disposing the peripheral conductors 70 on the outer side of the columnar conductors 51, the peripheral conductor 70 can prevent electromagnetic coupling with the adjacent antenna devices 1. As described above, it is possible to improve radiation efficiency of the antenna device 1.

The plurality of columnar conductors 51 include the plurality of first columnar conductors 52 disposed between the first end parts 61 of the dielectric layer 60 in the y direction and the radiation conductors 10A and 10B, and the plurality of second columnar conductors 53 disposed between the second end parts 62 of the dielectric layer 60 in the x direction perpendicular to the y direction, and the radiation conductors 10A and 10B. The first distance L1 between the plurality of first columnar conductors 52 and the first end parts 61 of the dielectric layer 60 is shorter than the second distance L2 between the plurality of second columnar conductors 53 and the second end parts 62 of the dielectric layer 60. The peripheral conductors 70 may be disposed on the outer side of the plurality of first columnar conductors 52 in plan view seen from the normal direction.

The first distance L1 between the plurality of first columnar conductors 52 and the first end parts 61 of the dielectric layer 60 is shorter than the second distance L2 between the plurality of second columnar conductors 53 and the second end parts 62 of the dielectric layer 60. Hence, the first columnar conductors 52 have a shorter distance to the end parts of the dielectric layer 60. By disposing the peripheral conductors 70 on the outer side of the first columnar conductors 52, the peripheral conductors 70 can prevent electromagnetic coupling with the adjacent antenna devices 1. As described above, it is possible to improve radiation efficiency of the antenna device 1.

Figure 8C:
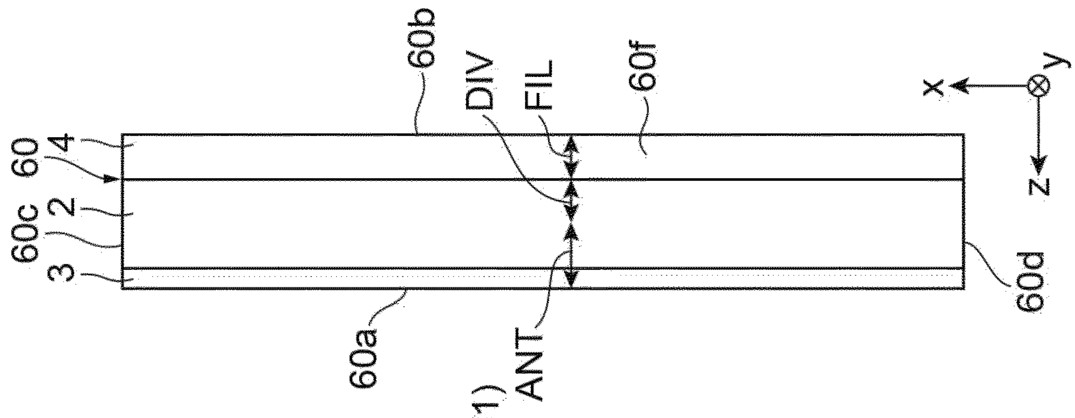
FIGS. 8A to 8C are views each illustrating an antenna device according to a comparative example.
Figure 8B:
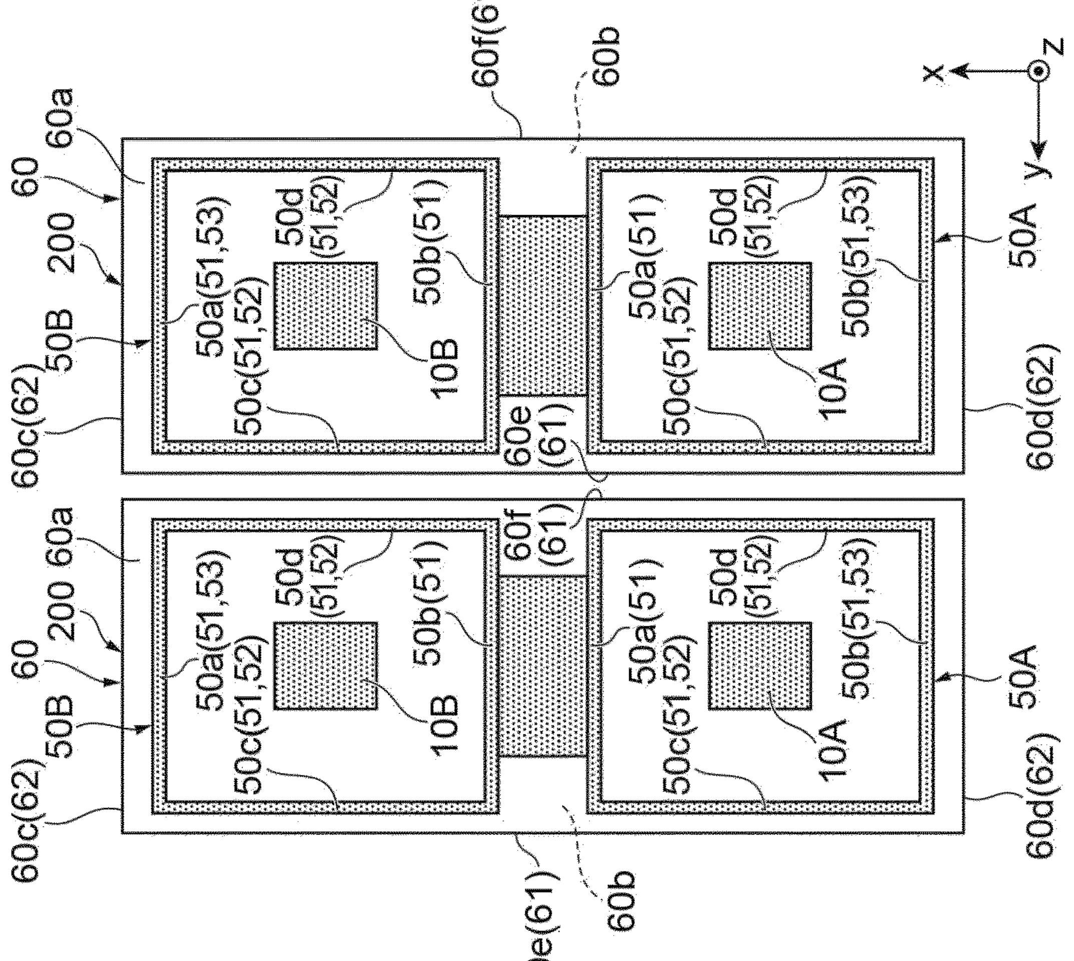
Figure 8A:
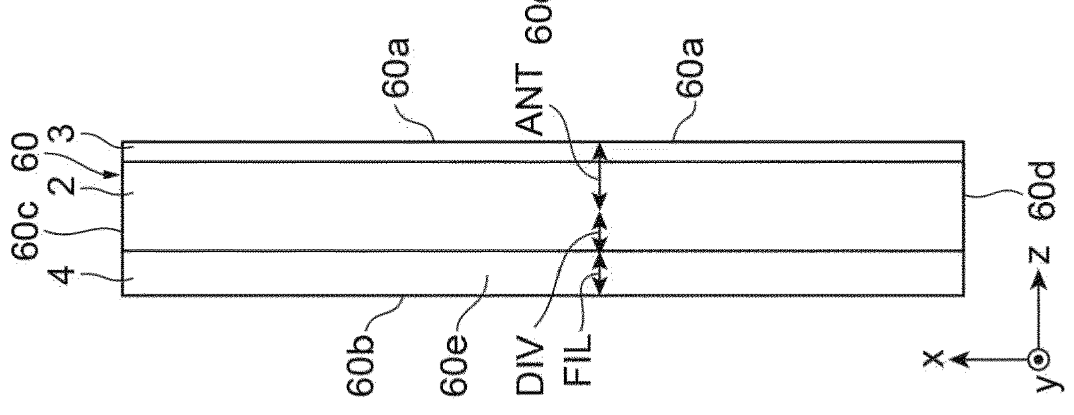
Figure 9A:
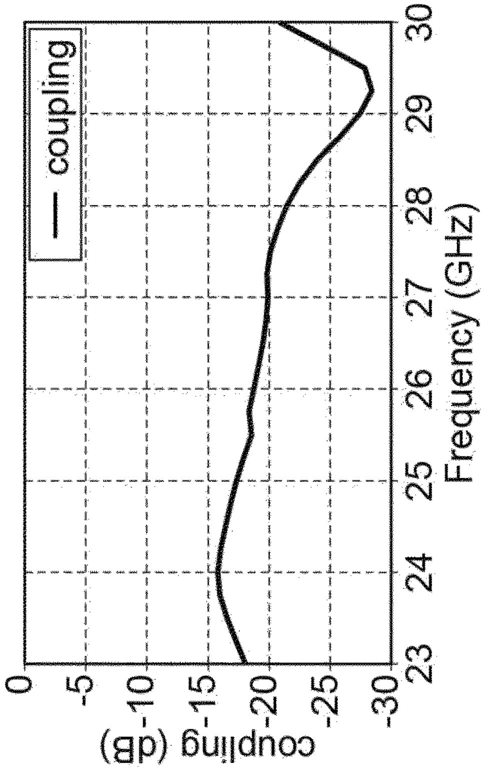
FIGS. 9A to 9C are graphs showing simulation results.
Figure 9B:
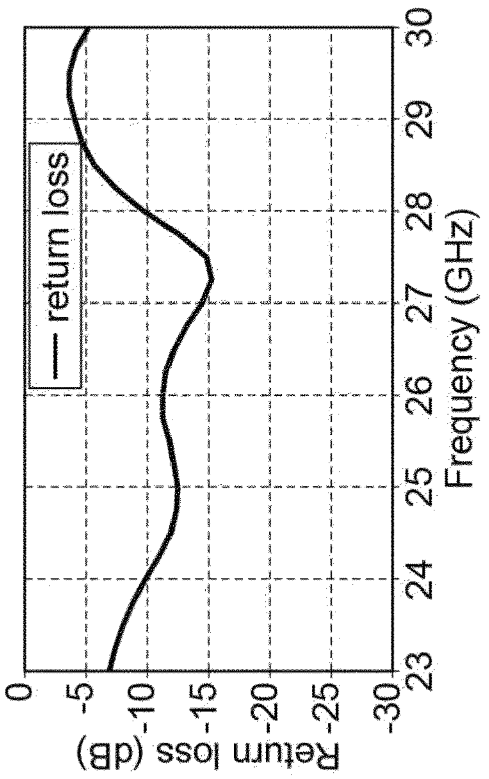
Figure 9C:
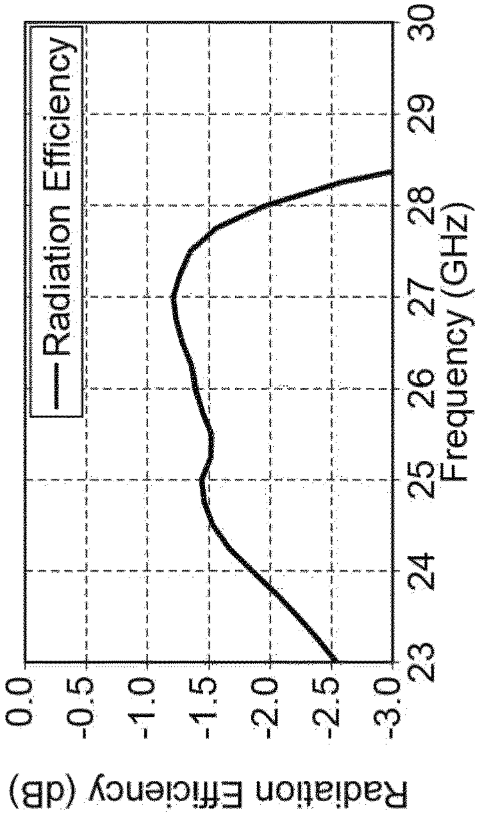

Here, an antenna device 200 according to a comparative example will be described with reference to FIGS. 8A to 8C. The antenna device 200 differs from the antenna device 1 illustrated in FIGS. 6A to 6C in that the antenna device 200 does not include the peripheral conductors 70. An antenna module in which the three antenna devices 200 were aligned in the y direction was created, and the antenna module was adjusted at a frequency of 24.25 to 27.5 GHz to obtain characteristics related to "Pol V" by electromagnetic field simulation. Simulation results are shown in FIGS. 9A to 9C. In the antenna device 200 according to the comparative example, "coupling" with adjacent antennas is stronger. Hence, it was confirmed that "radiation efficiency" lowered around 25 GHZ. Although it is desirable to insert a shield into a gap between the antenna devices 1 in the antenna module, there is a problem that it is difficult to dispose the shield because the gap is narrow.

Figure 7A:
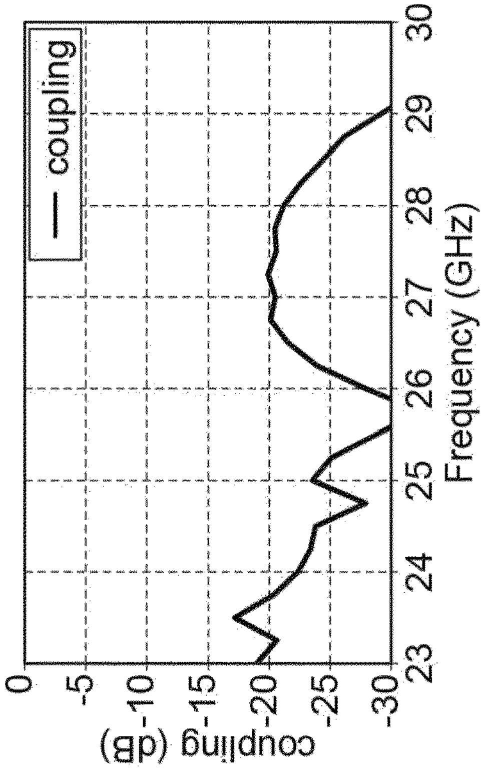
FIGS. 7A to 7C are graphs showing simulation results.
Figure 7B:
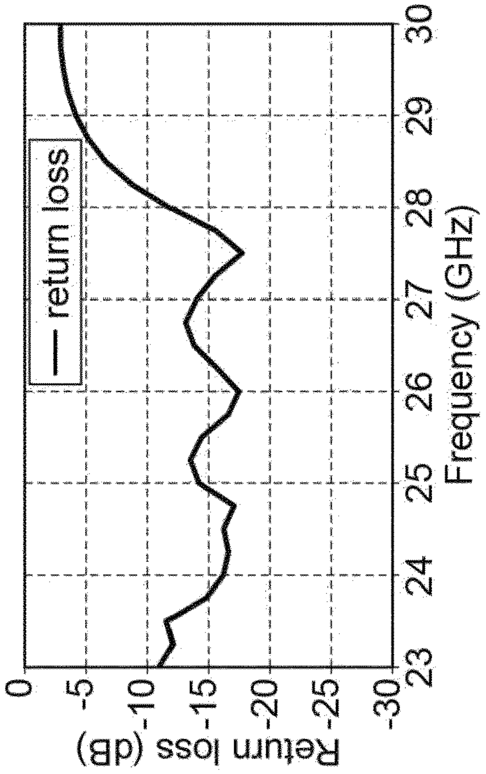
Figure 7C:
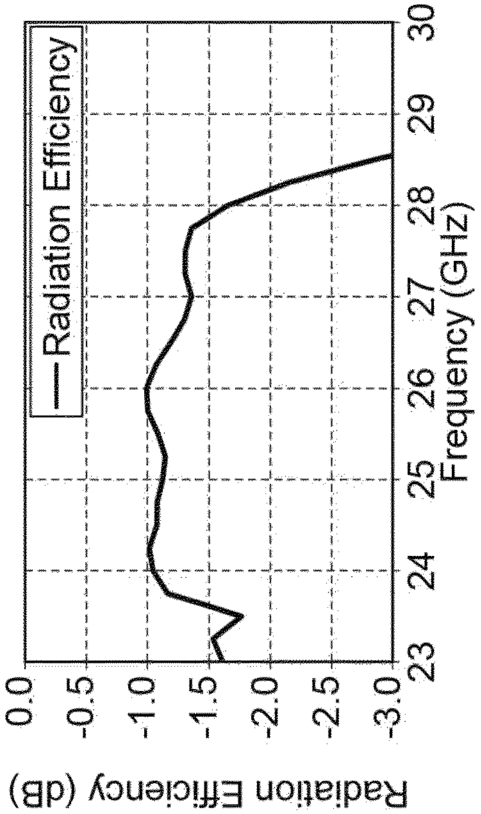

By contrast with this, simulation results of an antenna module in which the three antenna devices 1 illustrated in FIGS. 6A to 6C were aligned are shown in FIGS. 7A to 7C. As illustrated in FIGS. 7A to 7C, good results were obtained for "coupling" and "radiation efficiency" as compared with the results in FIGS. 9A to 9C according to the comparative example. Furthermore, as illustrated in FIG. 7B, it was possible to reduce "return loss" as compared with the result in FIGS. 9A to 9C according to the comparative example. Consequently, it was confirmed that the radiation efficiency was improved by providing the peripheral conductors 70.

The peripheral conductor 70 may be disposed on the outer side of each of the plurality of first columnar conductors 52 on the one side in the y direction, and the plurality of first columnar conductors 52 on the other side in the y direction. In this case, it is possible to improve radiation efficiency in a wide band as compared with the antenna device 1 (see FIG. 22) in which the peripheral conductors are disposed only on one side in the y direction.

Both edges of the peripheral conductor 70 in the x direction may be located on the inner side of the columnar conductors located at both ends of the plurality of first columnar conductors 52 in the x direction. In this case, it is possible to improve the radiation efficiency of the antenna device 1 by preventing the peripheral conductors 70 from becoming larger more than necessary.

The peripheral conductors 70 may be disposed on the side surfaces 60*e* and 60*f* of the dielectric layer 60 that expands along the normal direction of the radiation conductors 10A and 10B. In this case, the peripheral conductors 70 can improve radiation efficiency by sufficiently preventing electromagnetic coupling with the adjacent antenna devices 1.

The edges 70*a* of the peripheral conductors 70 on the lower side in the normal direction of the radiation conductors 10A and 10B may be spaced away from the bottom surface 60*b* of the dielectric layer 60 on the lower side in the normal direction. In this case, it is possible to improve the radiation efficiency of the antenna device 1 by preventing the peripheral conductors 70 from becoming larger more than necessary.

The dielectric layer 60 includes the antenna layer ANT in which the power feeding conductors 13V and 13H coupled with the radiation conductors 10A and 10B are disposed, the filter layer FIL that includes conductor patterns, and the distribution layer DIV that is disposed between the filter layer FIL and the antenna layer ANT, and the edges 70*a* of the peripheral conductors 70 on the lower side in the normal direction of the radiation conductors 10A and 10B may overlap the distribution layer DIV on the side surfaces 60*e* and 60*f* of the dielectric layer 60 that expands along the normal direction of the radiation conductors 10A and 10B.

The ground conductor G2 may be provided between the antenna layer ANT and the distribution layer DIV, and the peripheral conductors 70 may not be connected with the ground conductor G2. In this case, it is possible to suppress a decrease in radiation efficiency caused by connecting the peripheral conductors 70 with the ground conductor G2.

The radiation conductor 10 may include the radiation conductor 10A (first radiation conductor) and the radiation conductor 10B (second radiation conductor) disposed side by side in the x direction, and the peripheral conductor 70 may include the first peripheral conductors 70A located on the outer side of the plurality of first columnar conductors 52 disposed around the radiation conductor 10A, and the second peripheral conductor 70B located on the outer side of the plurality of first columnar conductors 52 disposed around the radiation conductor 10B, and the first peripheral conductor 70A and the second peripheral conductor 70B may be spaced away from each other. In this case, it is possible to prevent the peripheral conductors 70 from becoming larger more than necessary, and improve the radiation efficiency.

The antenna module 100 according to the present embodiment may include the plurality of above-described antenna devices 1, and the plurality of antenna devices 1 may be disposed such that the peripheral conductors 70 thereof face each other. In this case, the facing peripheral conductors 70 can prevent electromagnetic coupling between the adjacent antenna devices 1, and improve radiation efficiency in a wide band.

The present disclosure is not limited to the above-described embodiment.

Figures 10A, 10B, 10C:
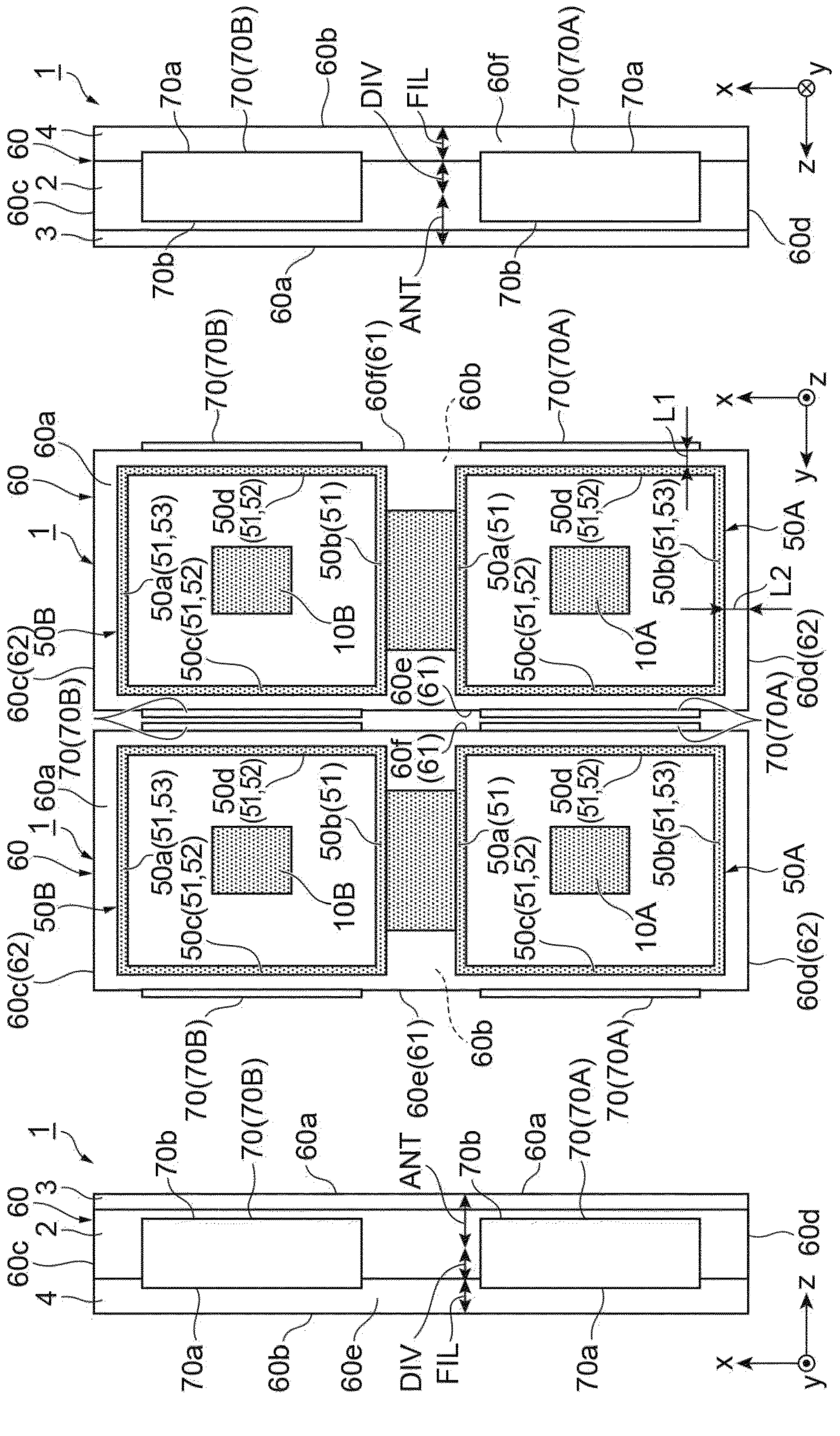
FIGS. 10A to 10C are views each illustrating an antenna device according to a modification.
Figure 11B:
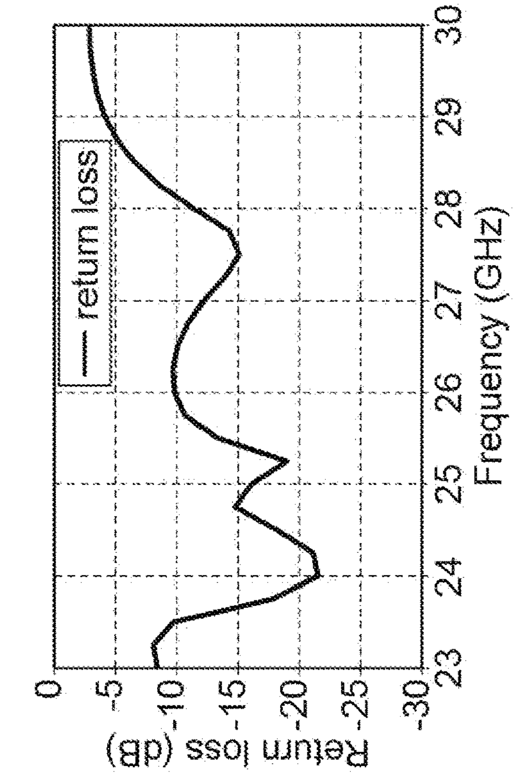
FIGS. 11A to 11C are graphs showing simulation results.
Figure 11A:
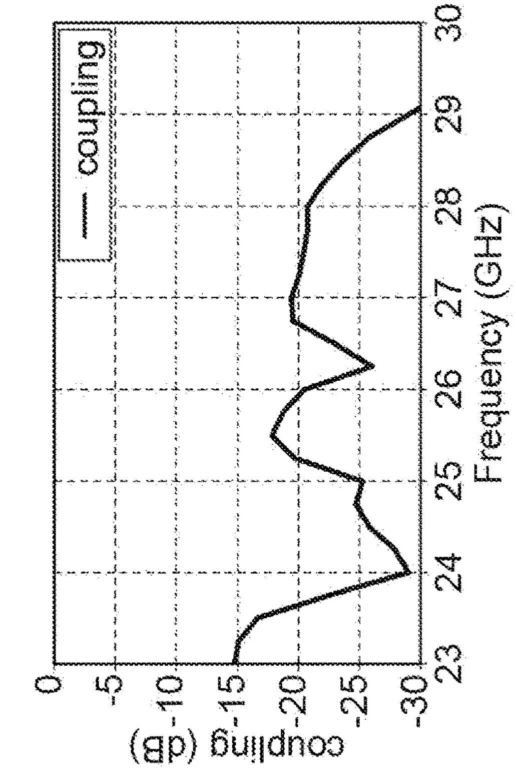
Figure 11C:
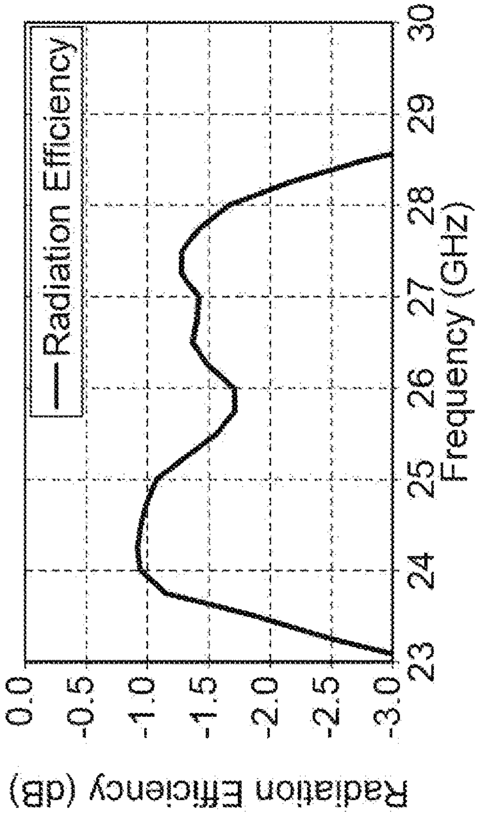

The positions of the edges 70*a* on the lower side and the edges 70*b* on the upper side of the peripheral conductors 70A and 70B are not limited to those in the above-described embodiment. For example, the antenna device 1 illustrated in FIGS. 10A to 10C may be adopted. In the antenna device 1 illustrated in FIGS. 10A to 10C, the peripheral conductors 70 are shifted by 0.5 mm toward and disposed on the lower side of the peripheral conductor 70 illustrated in FIGS. 6A to 6C as a whole. The edge 70*a* on the lower side is disposed at a position overlapping the filter layer FIL. Furthermore, the edge 70*b* on the upper side is disposed at a position overlapping the first dielectric layer 2. FIGS. 11A to 11C show the simulation results of an antenna module in which the three antenna devices 1 illustrated in FIGS. 10A to 10C were aligned. As illustrated in FIGS. 11A to 11C, good results were obtained for "radiation efficiency" as compared with the results in FIGS. 9A to 9C according to the comparative example. Furthermore, as illustrated in FIG. 11B, it was possible to reduce "return loss" as compared with the result in FIGS. 9A to 9C according to the comparative example. In this regard, since the frequency range is wider in FIGS. 7A to 7C, it was confirmed that the radiation efficiency was improved by providing the peripheral conductors 70 at positions as close as possible to the antenna layer ANT.

Figures 12A, 12B, 12C:
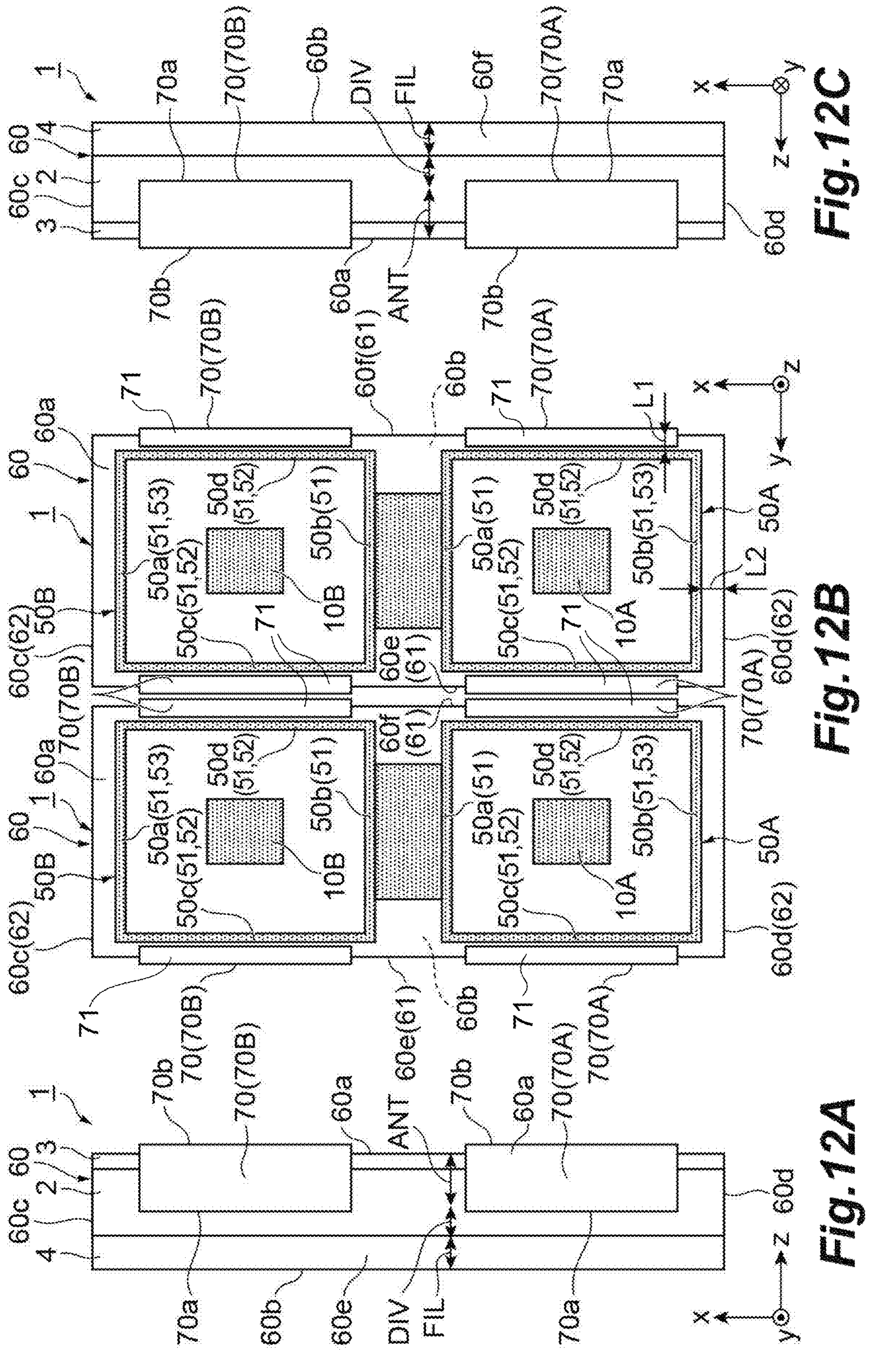
FIGS. 12A to 12C are views each illustrating the antenna device according to the modification.
Figure 13A:
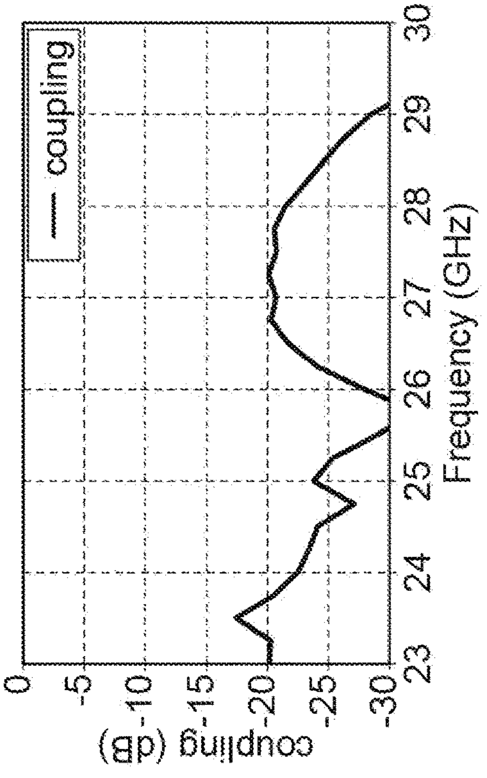
FIGS. 13A to 13C are graphs showing simulation results.
Figure 13B:
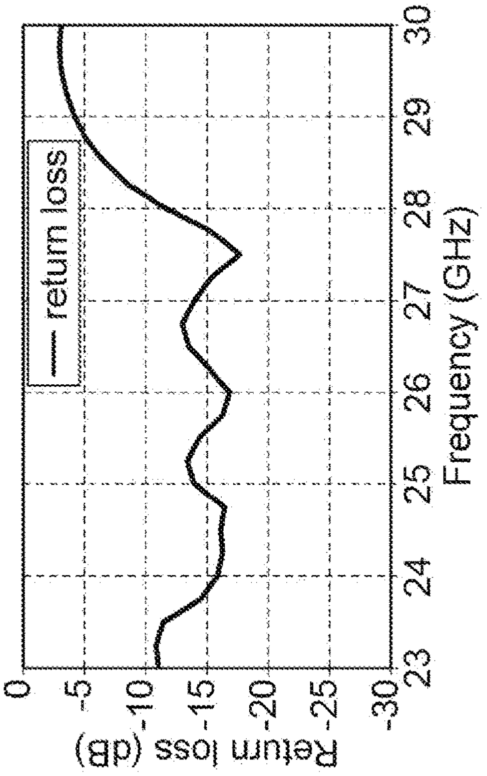
Figure 13C:
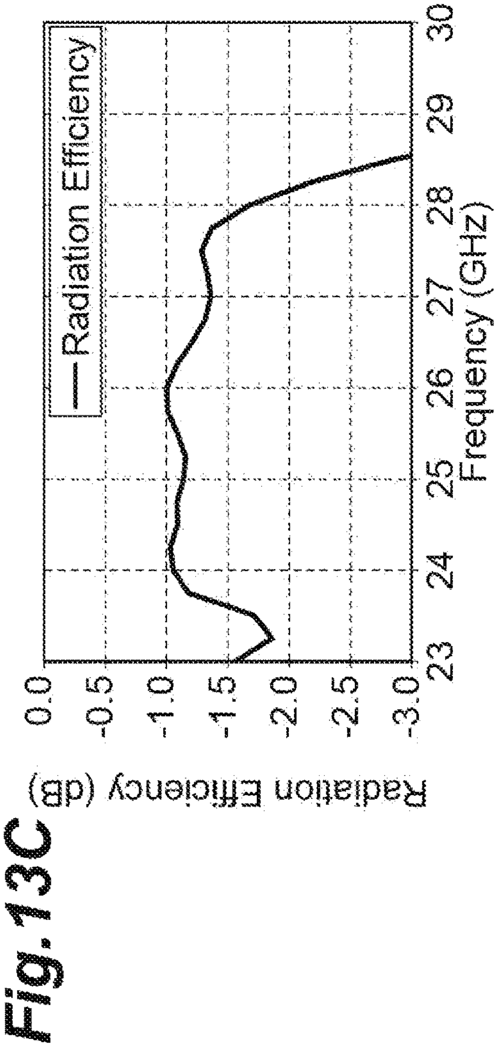

As illustrated in FIGS. 12A to 12C, an upper surface conductor 71 coupled with the peripheral conductor 70 may be disposed on the outer side of the plurality of columnar conductors 51 and on the top surface 60*a* on an upper side of the dielectric layer 60 in the normal direction in plan view seen from the normal direction of the radiation conductors 10A and 10B. The edge 70*b* on the upper side of the peripheral conductor 70 extends to the top surface 60*a* of the dielectric layer 60. Furthermore, the upper surface conductor 71 extends from the edge 70*b* on the upper side of the peripheral conductor 70 toward the inner side of the top surface 60*a* of the dielectric layer 60 in the y direction. FIGS. 13A to 13C show the simulation results of an antenna module in which the three antenna devices 1 illustrated in FIGS. 12A to 12C were aligned. As illustrated in FIGS. 13A to 13C, good results were obtained for "coupling" and "radiation efficiency" as compared with the results in FIGS. 9A to 9C according to the comparative example. As illustrated in FIG. 13B, it was possible to reduce "return loss" as compared with the result in FIGS. 9A to 9C according to the comparative example.

Figure 14:
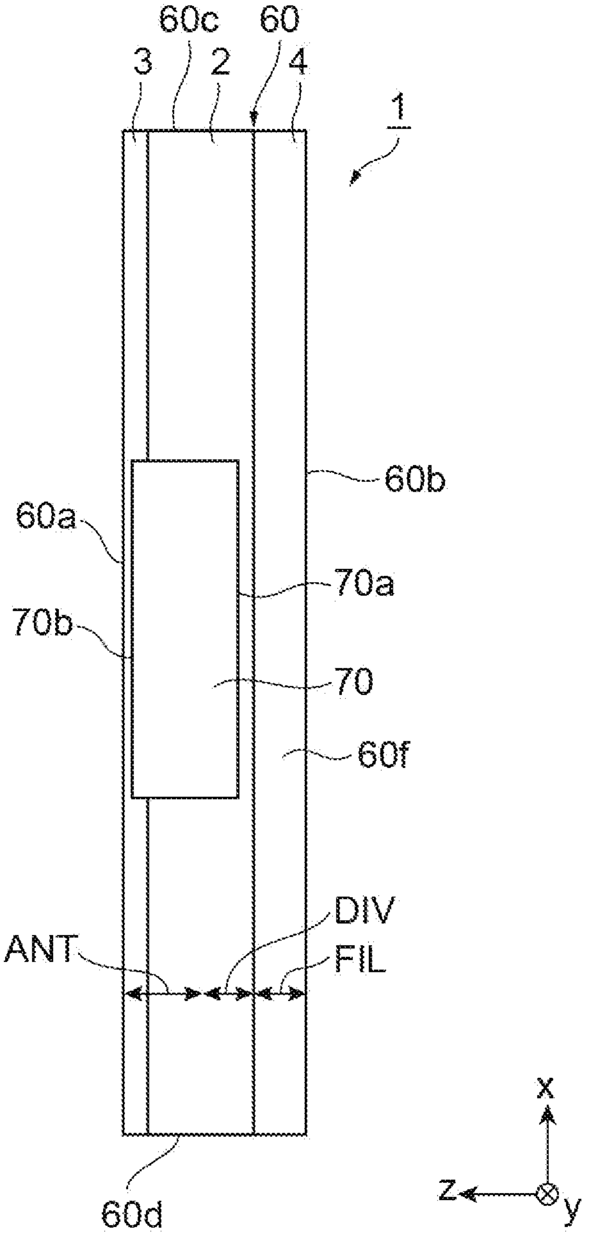
FIG. 14 is a view illustrating the antenna device according to the modification.
Figure 15A:
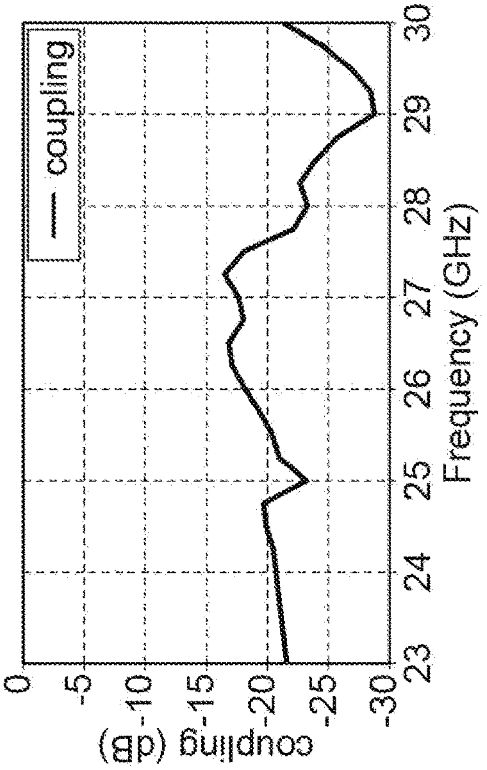
FIGS. 15A to 15C are graphs showing simulation results.
Figure 15B:
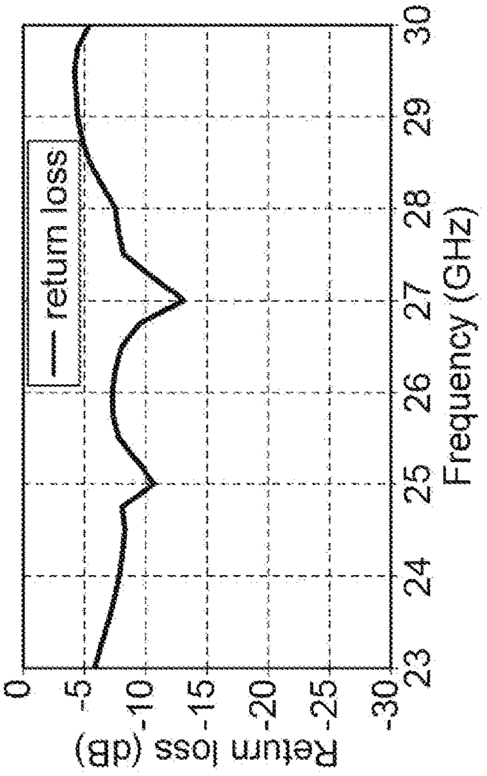
Figure 15C:
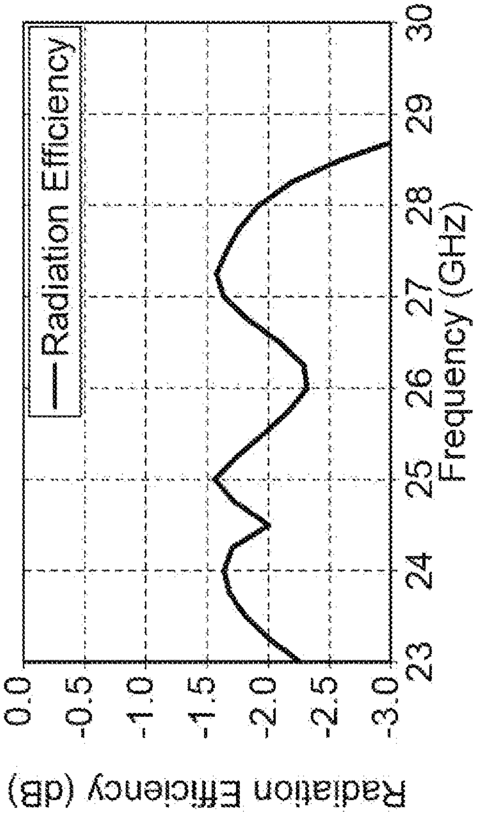

As illustrated in FIG. 14, the one peripheral conductor 70 may be disposed at the center position of the dielectric layer 60 in the x direction. FIGS. 15A to 15C show the simulation results of an antenna module in which the three antenna devices 1 illustrated in FIG. 14 were aligned. As illustrated in FIGS. 15A to 15C, good results were obtained for each characteristic as compared with the results in FIGS. 9A to 9C according to the comparative example. Note that it was possible to confirm from the result of the antenna device 1 in FIGS. 6A to 6C that coupling between the antenna devices 1 was prevented from becoming strong, and the radiation efficiency was improved as compared with the result of FIGS. 15A to 15C.

Figure 16:
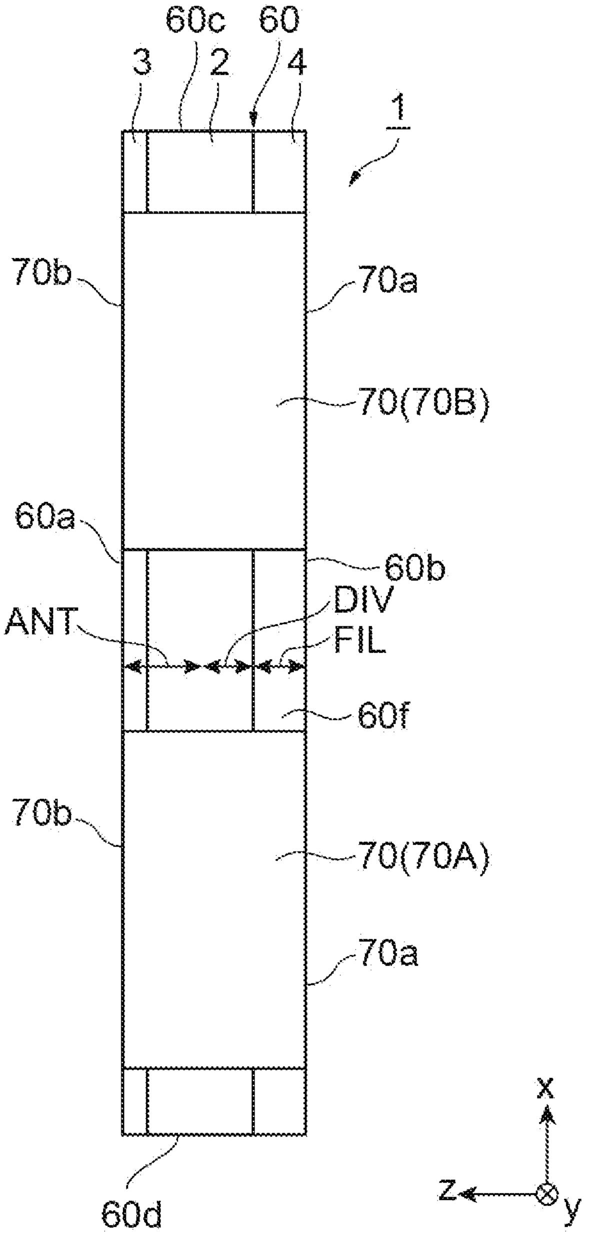
FIG. 16 is a view illustrating the antenna device according to the modification.
Figure 17A:
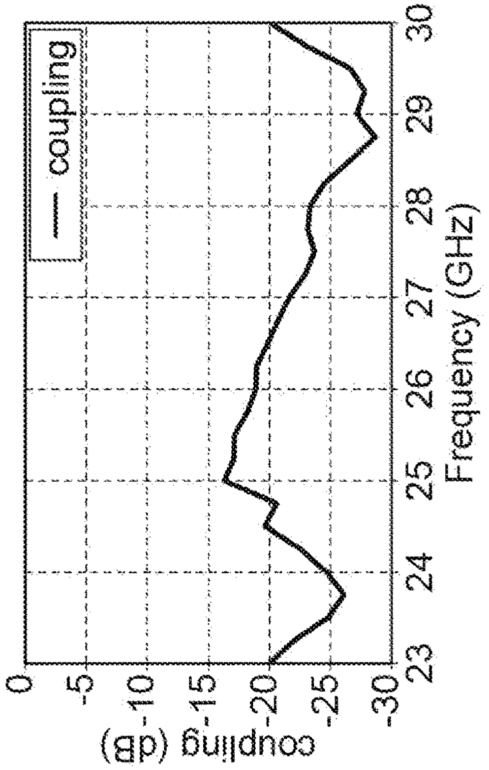
FIGS. 17A to 17C are graphs showing simulation results.
Figure 17B:
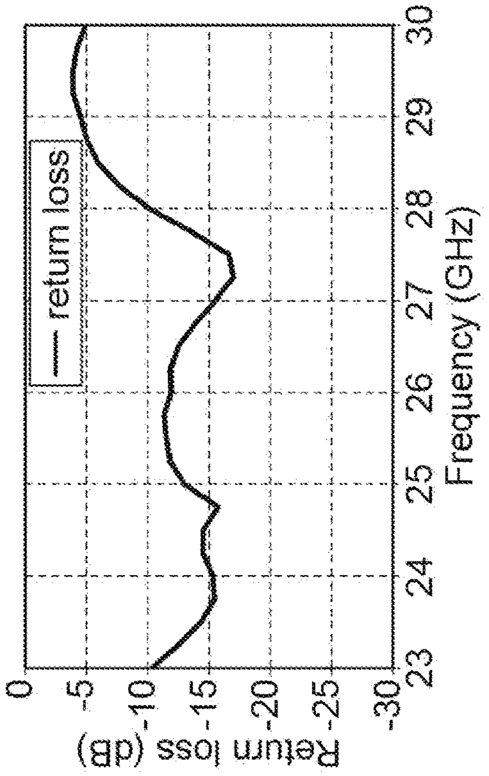
Figure 17C:
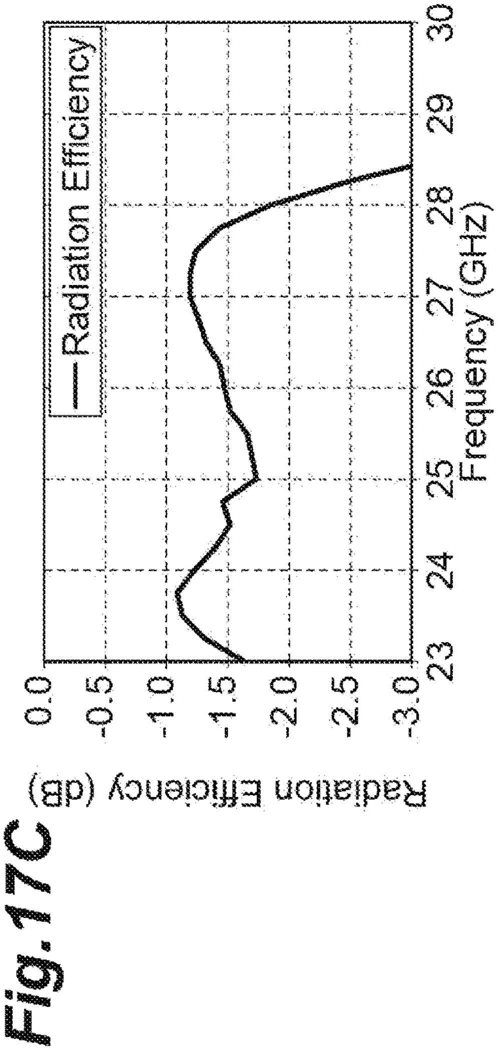

The antenna device 1 illustrated in FIG. 16 may be adopted. In the antenna device 1 illustrated in FIG. 16, the edge 70*a* on the lower side of the peripheral conductor 70 reaches the bottom surface 60*b* of the dielectric layer 60, and the edge 70*b* on the upper side reaches the top surface 60*a* of the dielectric layer 60. FIGS. 17A to 17C show the simulation results of an antenna module in which the three antenna devices 1 illustrated in FIG. 16 were aligned. As illustrated in FIGS. 17A to 17C, good results were obtained for each characteristic as compared with the results in FIGS. 9A to 9C according to the comparative example. Note that it was possible to confirm from the result of the antenna device 1 in FIGS. 6A to 6C that the radiation efficiency was improved as compared with the results in FIGS. 17A to 17C.

Figure 18:
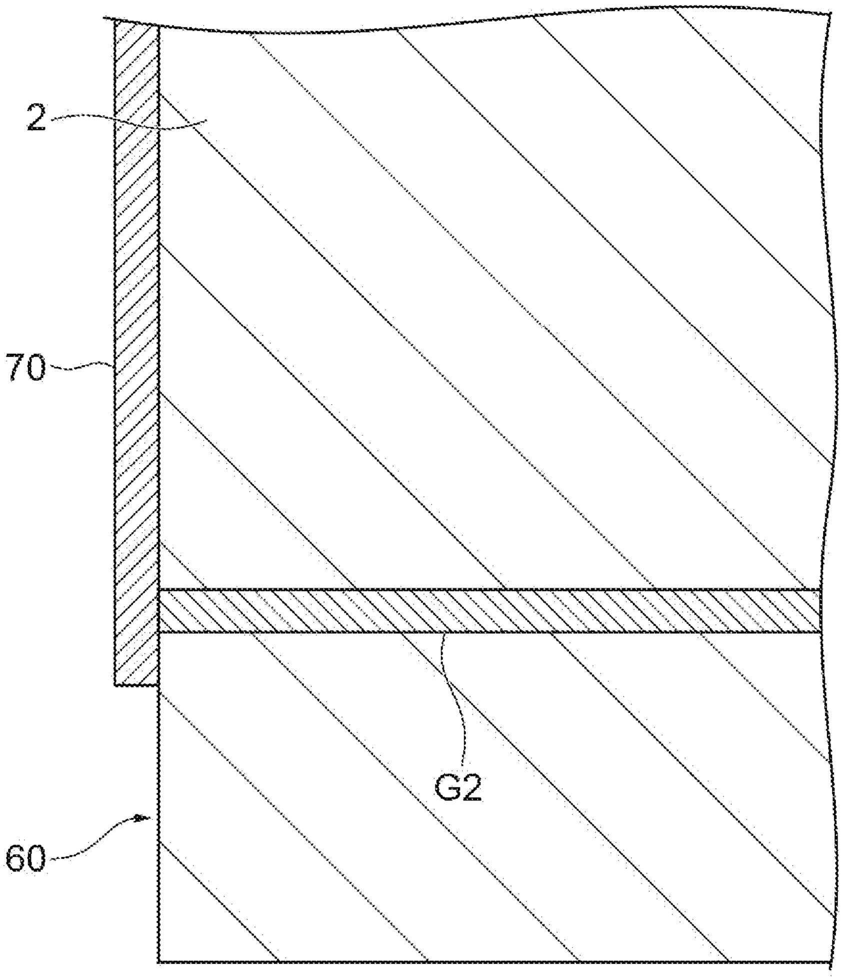
FIG. 18 is a view illustrating the antenna device according to the modification.
Figure 19A:
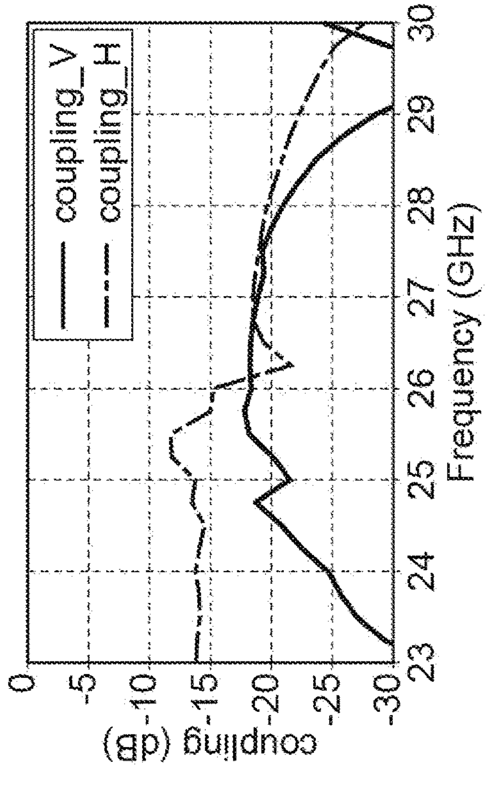
FIGS. 19A to 19C are graphs showing simulation results.
Figure 19B:
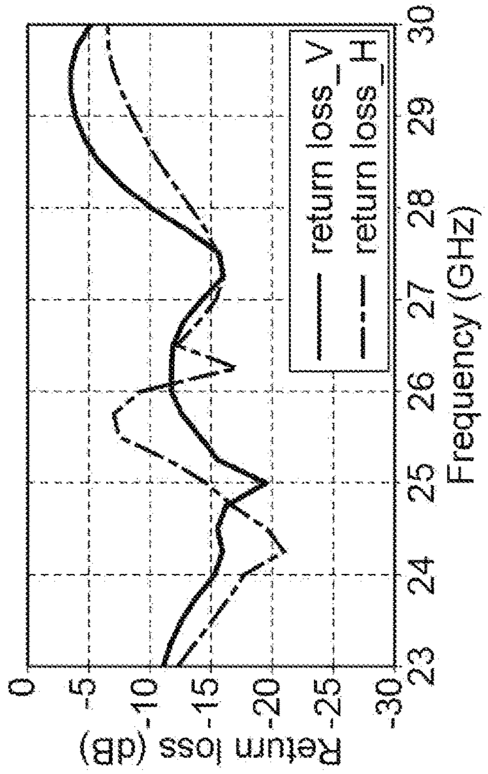
Figure 19C:
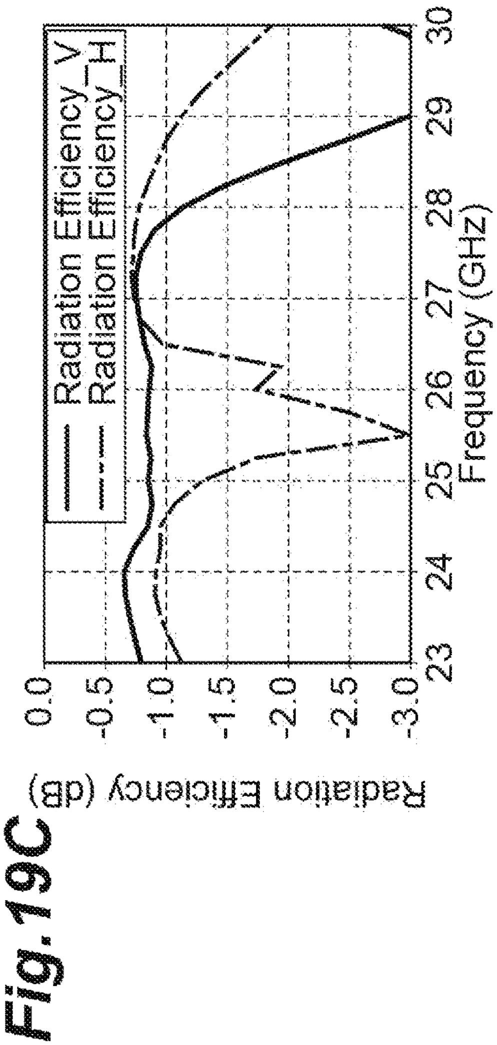

The antenna device 1 illustrated in FIG. 18 may be adopted. In the antenna device 1 illustrated in FIG. 18, the peripheral conductors 70 are connected with the ground conductor G2. Here, the ground conductor G2 extends to the end part of the dielectric layer 60, and is connected with the peripheral conductors 70. FIGS. 19A to 19C show the simulation results of an antenna module in which the three antenna devices 1 illustrated in FIG. 18 were aligned. FIGS. 19A to 19C show simulation results of "Pol V" and "Pol H". As shown in FIGS. 19A to 19C, the radiation efficiency of "Pol H" lowered.

Figure 20:
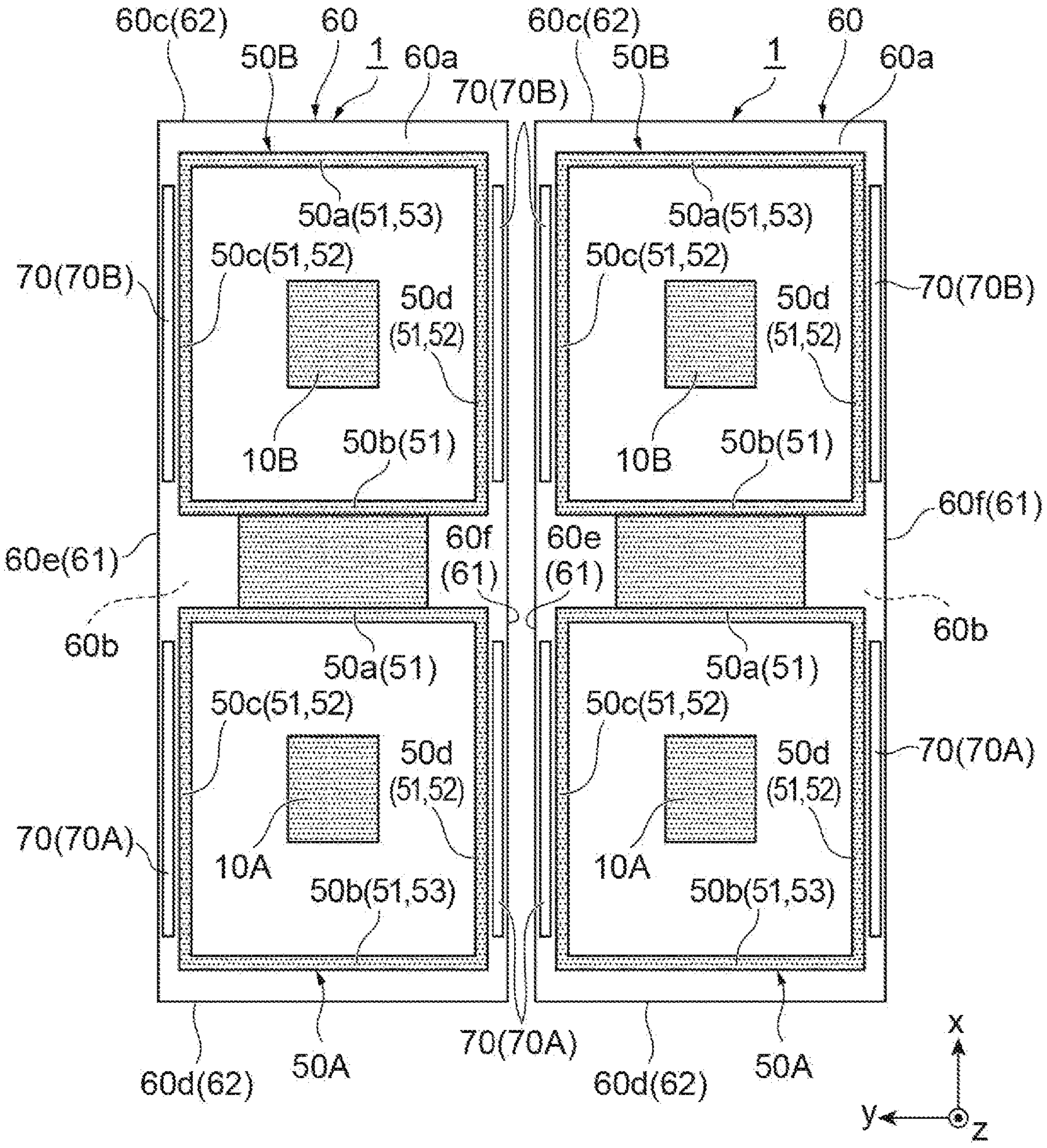
FIG. 20 is a view illustrating the antenna device according to the modification.
Figure 21A:
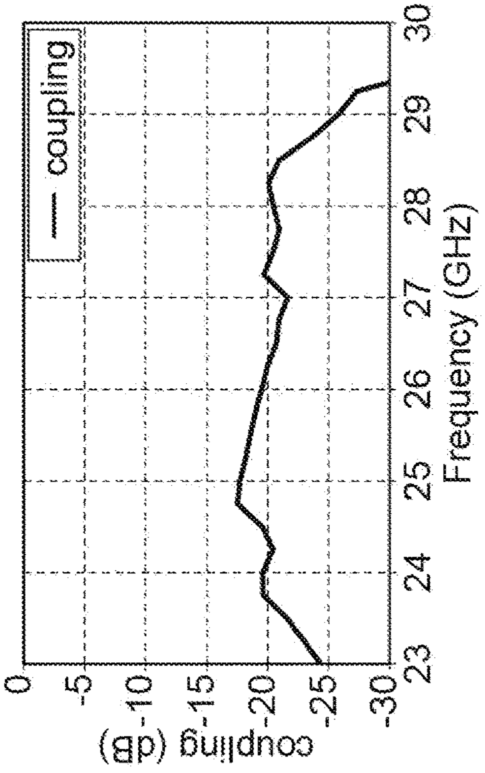
FIGS. 21A to 21C are graphs showing simulation results.
Figure 21B:
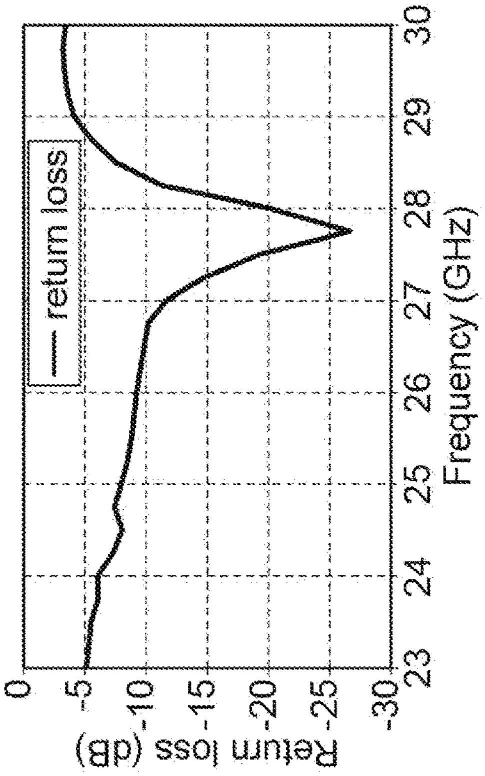
Figure 21C:
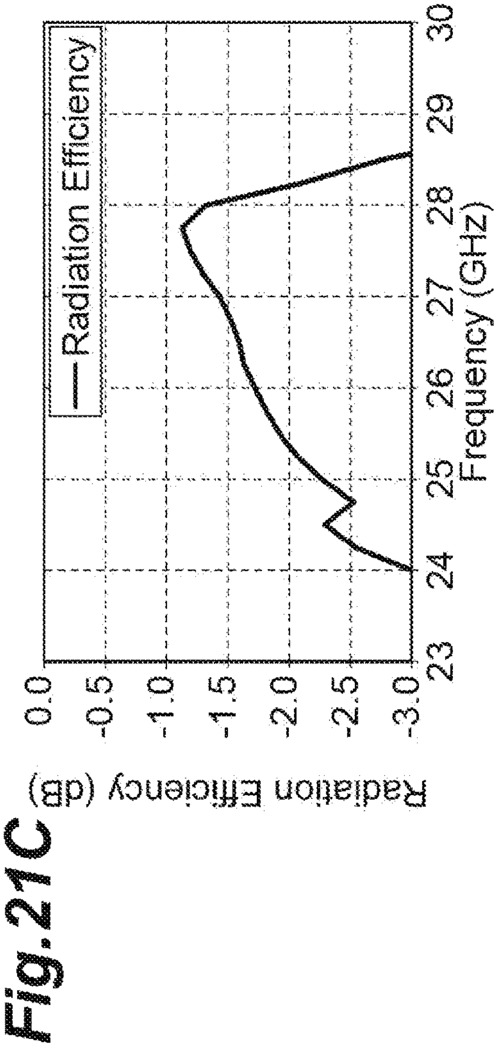

The antenna device 1 illustrated in FIG. 20 may be adopted. In the antenna device 1 illustrated in FIG. 20, the peripheral conductors 70 are disposed inside the dielectric layer 60. FIGS. 21A to 21C show the simulation results of an antenna module in which the three antenna devices 1 illustrated in FIG. 20 were aligned. As illustrated in FIGS. 21A to 21C, good results were obtained for each characteristic as compared with the results in FIGS. 9A to 9C according to the comparative example. Note that it was possible to confirm from the results of the antenna device 1 in FIGS. 6A to 6C that the radiation efficiency was improved as compared with the results in FIGS. 21A to 21C.

Figure 22:
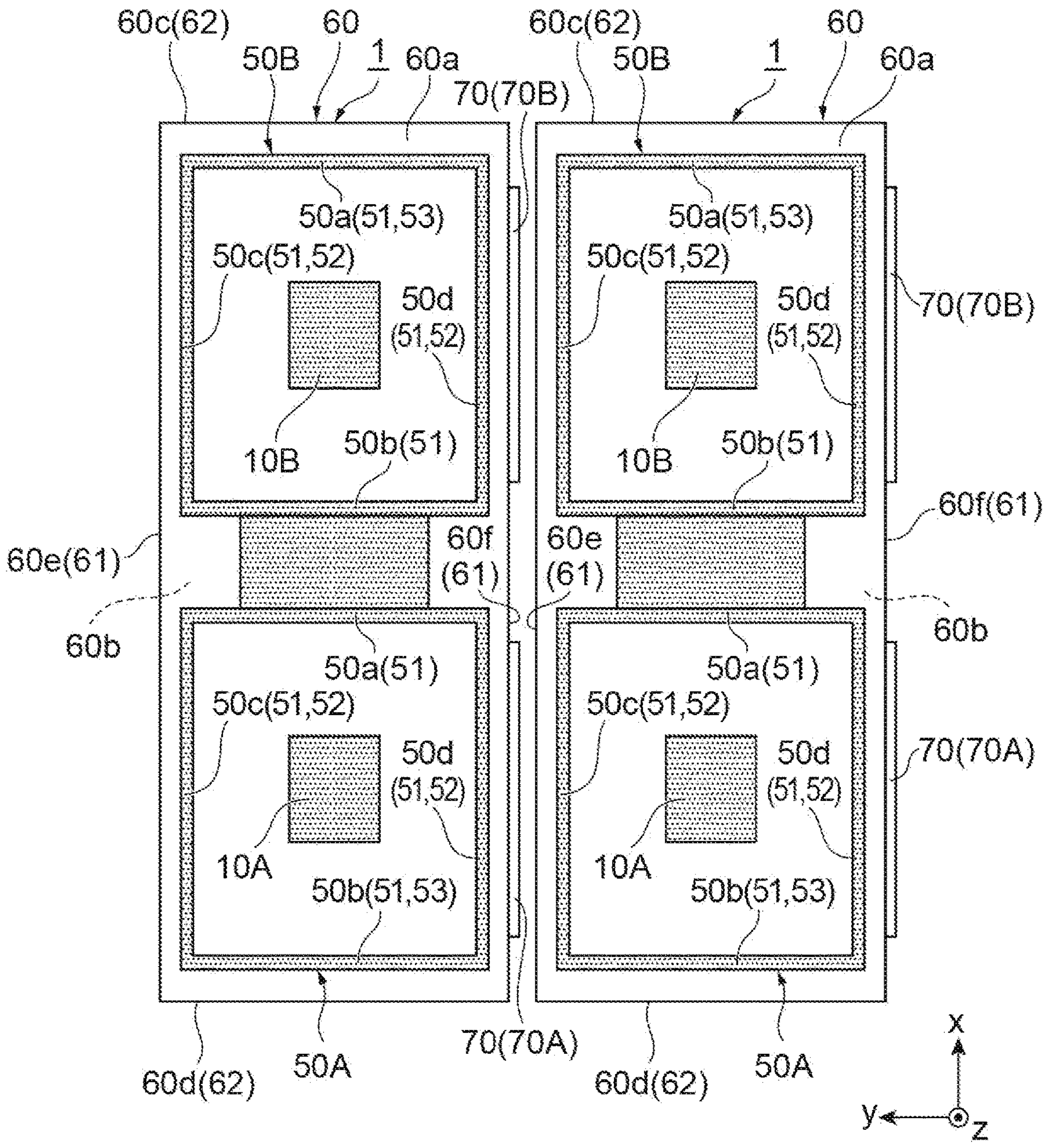
FIG. 22 is a view illustrating the antenna device according to the modification.
Figure 23B:
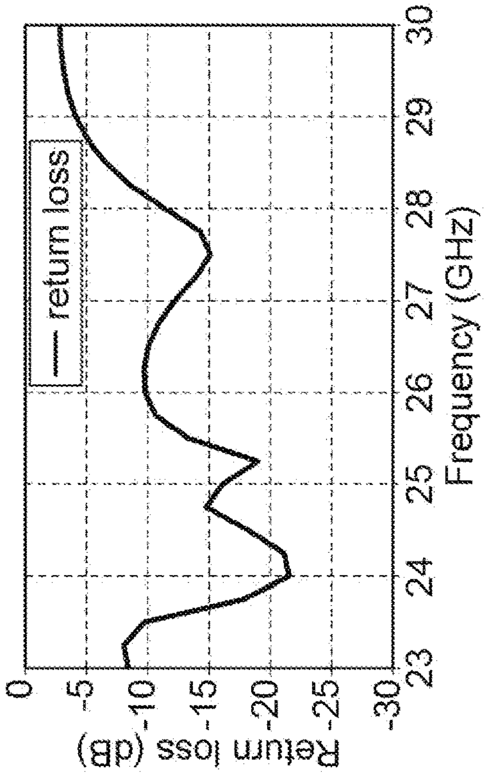
FIGS. 23A to 23C are graphs showing simulation results.
Figure 23A:
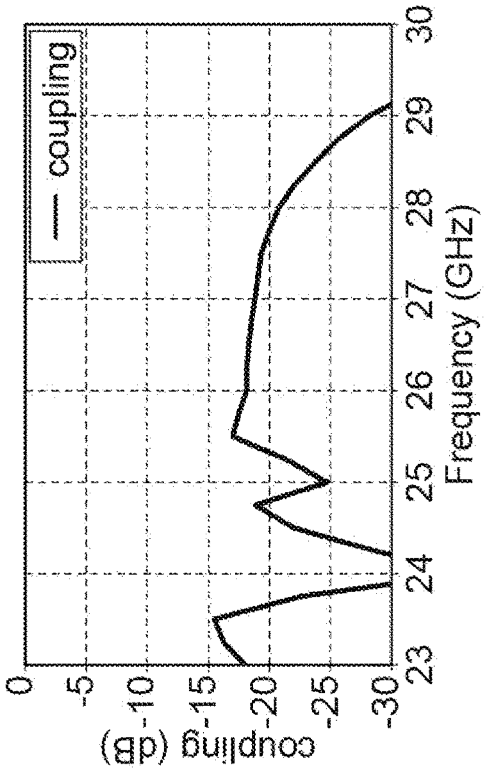
Figure 23C:
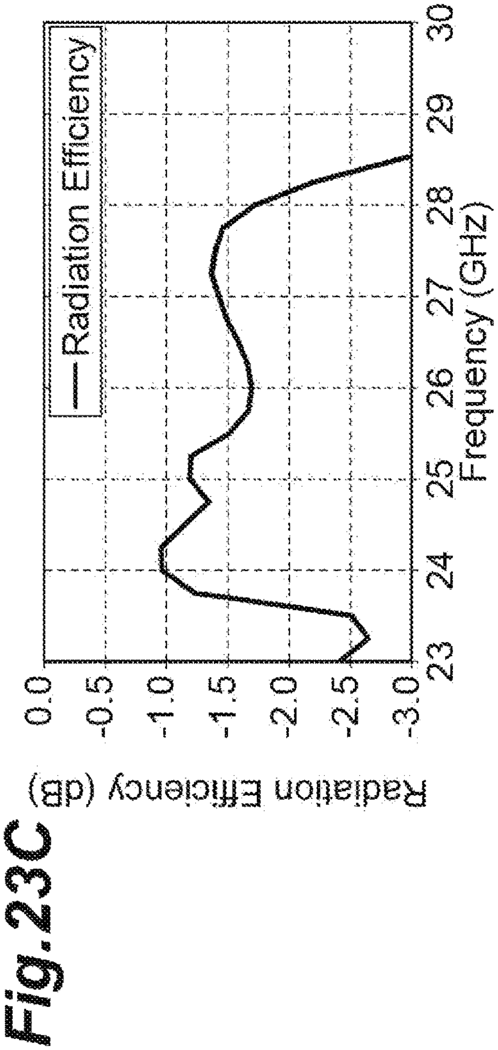

The antenna device 1 illustrated in FIG. 22 may be adopted. In the antenna device 1 illustrated in FIG. 22, the peripheral conductors 70 are disposed only on one side in the y direction. FIGS. 23A to 23C show the simulation results of an antenna module in which the three antenna devices 1 illustrated in FIG. 22 were aligned. As illustrated in FIGS. 23A to 23C, good results were obtained for each characteristic as compared with the results in FIGS. 9A to 9C according to the comparative example. Note that it was possible to confirm from the results of the antenna device 1 in FIGS. 6A to 6C that the radiation efficiency was improved as compared with the results in FIGS. 23A to 23C.

The technique according to the present disclosure includes the following configuration examples, yet is not limited thereto.

[Aspect 1]

An antenna device includes:

a dielectric layer;

a radiation conductor provided to the dielectric layer; and a plurality of columnar conductors disposed around the radiation conductor in plan view seen from a normal direction of the radiation conductor, and a peripheral conductor is disposed on an outer side of the plurality of columnar conductors in plan view seen from the normal direction.

[Aspect 2]

In the antenna device according to aspect 1, the plurality of columnar conductors include a plurality of first columnar conductors disposed between a first end part of the dielectric layer in a first direction and the radiation conductor, a plurality of second columnar conductors disposed between a second end part of the dielectric layer in a second direction perpendicular to the first direction, and the radiation conductor, a first distance between the plurality of first columnar conductors and the first end part of the dielectric layer is shorter than a second distance between the plurality of second columnar conductors and the second end part of the dielectric layer, and the peripheral conductor is disposed on the outer side of the plurality of first columnar conductors in plan view seen from the normal direction.

[Aspect 3]

In the antenna device according to aspect 2, the peripheral conductor is disposed on the outer side of each of the plurality of first columnar conductors on one side in the first direction and the plurality of first columnar conductors on an other side in the first direction.

[Aspect 4]

In the antenna device according to aspect 2 or 3, both edges of the peripheral conductor in the second direction are located on an inner side of the columnar conductors located at both ends of the plurality of first columnar conductors in the second direction.

[Aspect 5]

In the antenna device according to any one of aspects 1 to 4, the peripheral conductor is disposed on a side surface of the dielectric layer that expands along the normal direction of the radiation conductor.

[Aspect 6]

In the antenna device according to any one of aspects 1 to 5, an upper surface conductor coupled with the peripheral conductor is disposed on the outer side of the plurality of columnar conductors and on a top surface of the dielectric layer on an upper side in the normal direction in plan view seen from the normal direction of the radiation conductor.

[Aspect 7]

In the antenna device according to any one of aspects 1 to 6, an edge of the peripheral conductor on a lower side in the normal direction of the radiation conductor is spaced away from a bottom surface of the dielectric layer on a lower side in the normal direction.

[Aspect 8]

In the antenna device according to any one of aspects 1 to 7, the dielectric layer includes an antenna layer in which a power feeding conductor coupled with the radiation conductor is disposed, a filter layer including a conductor pattern, and a distribution layer disposed between the antenna layer and the filter layer, and an edge of the peripheral conductor on a lower side in the normal direction of the radiation conductor overlaps the distribution layer on a side surface of the dielectric layer that expands along the normal direction of the radiation conductor.

[Aspect 9]

The antenna device according to aspect 8 further includes a ground conductor between the antenna layer and the distribution layer, and the peripheral conductor is not connected with the ground conductor.

[Aspect 10]

In the antenna device according to any one of aspects 2 to 4, the radiation conductor includes first and second radiation conductors disposed side by side in the second direction, the peripheral conductor includes a first peripheral conductor located on an outer side of the plurality of first columnar conductors disposed around the first radiation conductor, and a second peripheral conductor located on an outer side of the plurality of first columnar conductors disposed around the second radiation conductor, and the first peripheral conductor and the second peripheral conductor are spaced away from each other.

[Aspect 11]

An antenna module includes a plurality of the antenna devices according to any one of aspects 1 to 10, and the plurality of antenna devices are disposed such that the peripheral conductors thereof face each other.

REFERENCE SIGNS LIST

1 antenna device
10 radiation conductor
10A radiation conductor (first radiation conductor)
10B radiation conductor (second radiation conductor)
13H, 13V power feeding conductor
14H, 14V power feeding conductor
51 columnar conductor
52 first columnar conductor
53 second columnar conductor
60 dielectric layer
70 peripheral conductor
70A first peripheral conductor
70B second peripheral conductor
71 upper surface conductor
10 ANT antenna layer
DIV distribution layer
FIL filter layer
G2 ground conductor

What is claimed is:

1. An antenna device comprising:

a dielectric layer;

a radiation conductor provided to the dielectric layer; and a plurality of columnar conductors disposed around the radiation conductor in plan view seen from a normal direction of the radiation conductor, wherein a peripheral conductor is disposed on an outer side of the plurality of columnar conductors in plan view seen from the normal direction, and the peripheral conductor has a first edge on a lower side in the normal direction and a second edge on a higher side in the normal direction, the first edge being between the second edge and a bottom surface of the dielectric layer on the lower side in the normal direction, the first edge being spaced away from and located above the bottom surface of the dielectric layer in the normal direction.

2. The antenna device according to claim 1, wherein the plurality of columnar conductors includes a plurality of first columnar conductors disposed between a first end part of the dielectric layer in a first direction and the radiation conductor, and a plurality of second columnar conductors disposed between a second end part of the dielectric layer in a second direction perpendicular to the first direction, and the radiation conductor, a first distance between the plurality of first columnar conductors and the first end part of the dielectric layer is shorter than a second distance between the plurality of second columnar conductors and the second end part of the dielectric layer, and the peripheral conductor is disposed on the outer side of the plurality of first columnar conductors in plan view seen from the normal direction.

3. The antenna device according to claim 2, wherein the peripheral conductor is disposed on the outer side of each of the plurality of first columnar conductors on one side in the first direction and the plurality of first columnar conductors on an other side in the first direction.

4. The antenna device according to claim 2, wherein the peripheral conductor has two edges in the second direction, and both edges of the peripheral conductor in the second direction are located on an inner side of the columnar conductors located at both ends of the plurality of first columnar conductors in the second direction.

5. The antenna device according to claim 1, wherein the peripheral conductor is disposed on a side surface of the dielectric layer that expands along the normal direction of the radiation conductor.

6. The antenna device according to claim 1, wherein an upper surface conductor coupled with the peripheral conductor is disposed on the outer side of the plurality of columnar conductors and on a top surface of the dielectric layer on an upper side in the normal direction in plan view seen from the normal direction of the radiation conductor.

7. The antenna device according to claim 1, wherein the dielectric layer includes an antenna layer in which a power feeding conductor coupled with the radiation conductor is disposed, a filter layer including a conductor pattern, and a distribution layer disposed between the antenna layer and the filter layer, and the first edge of the peripheral conductor overlaps the distribution layer on a side surface of the dielectric layer that expands along the normal direction of the radiation conductor.

8. The antenna device according to claim 7, further comprising a ground conductor between the antenna layer and the distribution layer, wherein the peripheral conductor is not connected with the ground conductor.

9. The antenna device according to claim 2, wherein the radiation conductor includes first and second radiation conductors disposed side by side in the second direction, the peripheral conductor includes a first peripheral conductor located on an outer side of the plurality of first columnar conductors disposed around the first radiation conductor, and a second peripheral conductor located on an outer side of the plurality of first columnar conductors disposed around the second radiation conductor, and the first peripheral conductor and the second peripheral conductor are spaced away from each other.

10. An antenna module comprising a plurality of the antenna devices according to claim 1, wherein the plurality of antenna devices includes a first antenna device and a second antenna device, and the peripheral conductor of the first antenna device and the peripheral conductor of the second antenna device are disposed to face each other.

11. An antenna device comprising:

a dielectric layer;

a radiation conductor provided to the dielectric layer; and a plurality of columnar conductors disposed around the radiation conductor in plan view seen from a normal direction of the radiation conductor, wherein a peripheral conductor is disposed on an outer side of the plurality of columnar conductors in plan view seen from the normal direction, the dielectric layer includes an antenna layer in which a power feeding conductor coupled with the radiation conductor is disposed, a filter layer including a conductor pattern, and a distribution layer disposed between the antenna layer and the filter layer, and an edge of the peripheral conductor on a lower side in the normal direction of the radiation conductor overlaps the distribution layer on a side surface of the dielectric layer that expands along the normal direction of the radiation conductor.

* * * * *